(12) United States Patent
Mercado Alvarado

(10) Patent No.: US 12,546,322 B2
(45) Date of Patent: Feb. 10, 2026

(54) DRIED SLUDGE DISTRIBUTION SYSTEM

(71) Applicant: Adalberto Mercado Alvarado, Bayamon, PR (US)

(72) Inventor: Adalberto Mercado Alvarado, Bayamon, PR (US)

(*) Notice: Subject to any disclaimer, the term of this patent is extended or adjusted under 35 U.S.C. 154(b) by 0 days.

(21) Appl. No.: 18/666,458

(22) Filed: May 16, 2024

(65) Prior Publication Data
US 2025/0354558 A1 Nov. 20, 2025

(51) Int. Cl.
F04D 13/08 (2006.01)
C02F 11/127 (2019.01)
F04D 7/00 (2006.01)

(52) U.S. Cl.
CPC .......... F04D 13/086 (2013.01); C02F 11/127 (2013.01); F04D 7/00 (2013.01)

(58) Field of Classification Search
CPC . F04D 13/086; F04D 7/00; F04D 7/02; F04D 7/04; F04D 7/045; C02F 11/127; B01F 27/112; B01F 27/1123; B01F 27/1125; B01F 27/11252; B01F 27/11253; B01F 27/1127
See application file for complete search history.

(56) References Cited

U.S. PATENT DOCUMENTS 2,769,255 A * 11/1956 Mead .................. E01H 5/04
37/257

* cited by examiner

Primary Examiner — Loren C Edwards
(74) Attorney, Agent, or Firm — Eugenio J. Torres-Oyola; Victor M. Rodriguez-Reyes; Rafael Rodriguez-Muriel

(57) ABSTRACT

A dried sludge distribution system that includes a motor, a drive reducer, a shaft, a spacer, a housing, and a mounted ball bearing, in which the housing includes an interior volume that is adapted to accommodate a rotating shovel that includes one or more shoveling areas that extend perpendicularly from its central hollow cylinder, and in which the one or more shoveling areas are interconnected with each other.

20 Claims, 25 Drawing Sheets

DRIED SLUDGE DISTRIBUTION SYSTEM

FIELD OF THE DISCLOSURE

The present disclosure relates generally to a dried sludge distribution system.

BACKGROUND OF THE DISCLOSURE

Dried sludge or "sludge cake" is a by-product produced from the dewatering of sludge at a wastewater treatment plant. The disposal of the dried sludge generally entails a labor-intensive process. Typically, such activity requires shoveling the dried sludge onto a conveyor system that leads the dried residue into a container. The issue with this technique is that once the dried sludge reaches the container, it will continue to accumulate and pile up unless someone shovels and distributes the dried sludge throughout the space within the container. Such distribution within the container will require someone to be physically present in the container shoveling the dried sludge to prevent its accumulation in a single area of the container.

Accordingly, there is a need for a mechanism that efficiently distributes dried sludge throughout a container once it has been transported via a conveyor system without having to rely on someone to manually shovel and distribute the dried sludge.

SUMMARY OF THE DISCLOSURE

The subject disclosure relates to a dried sludge distribution system, comprising a motor, a drive reducer, a shaft, a spacer, a rotating shovel, a housing, and a mounted ball bearing; wherein the housing includes a front wall, a rear wall, a first side wall, and a second side wall, in which the first and second side walls connect the front wall to the rear wall, and wherein the housing includes an open-ended top and an open-ended bottom opposite each other, thereby defining an interior volume on the housing; wherein the motor is connected to the drive reducer; wherein the drive reducer includes a base that comprises a shaft coupling unit; wherein the shaft includes a body having a first end adapted to couple with the shaft coupling unit, and a second end adapted to couple with the shovel, wherein each end of the shaft is opposite the other; wherein the spacer includes a first end connected to the drive reducer, a second end connected to the housing, and a hollow opening that longitudinally crosses the first end and the second end of the spacer; wherein the hollow opening of the spacer is adapted to receive the shaft; wherein the rotating shovel includes a central hollow cylinder having a first end adapted to receive the shaft and a second end, opposite to the first end, that is adapted to couple with the mounted ball bearing; wherein the rotating shovel comprises one or more shoveling areas extending perpendicularly from the central hollow cylinder, and wherein said one or more shoveling areas are interconnected with each other; wherein the rear wall of the housing includes an opening adapted to receive the shaft; and wherein the front wall of the housing includes an opening adapted to permit the second end of the central hollow cylinder of the rotating shovel to be secured to the mounted ball bearing.

DETAILED DESCRIPTION OF THE DISCLOSURE

Figure 1:
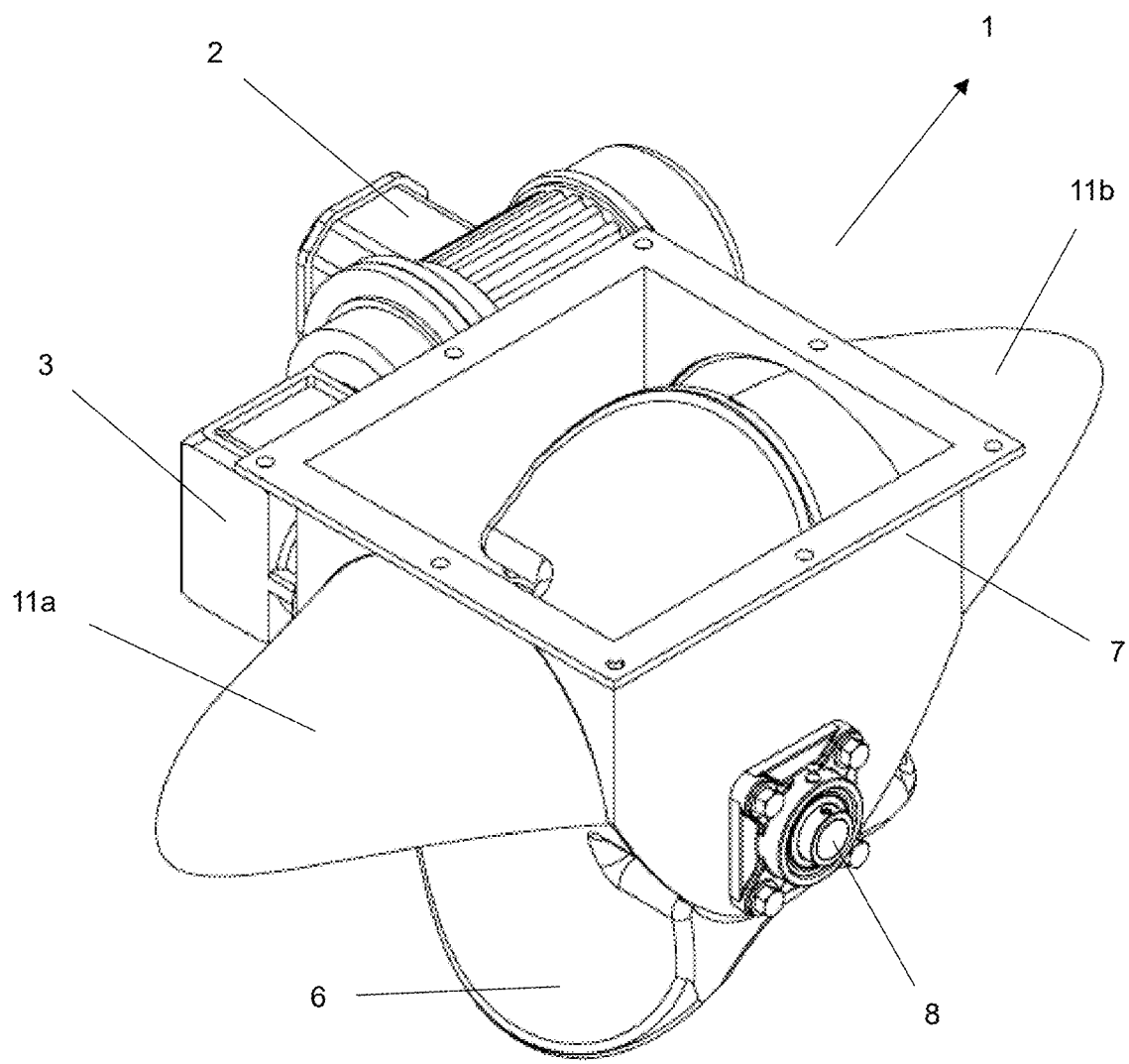
FIG. 1 shows a perspective view of a dried sludge distribution system, in accordance with the principles of the present disclosure.

FIGS. 1-10, 20, and 22-24 show a dried sludge distribution system 1, comprising a motor 2, a drive reducer or gear reducer 3, a shaft 4, a spacer 5, a rotating shovel 6, a housing 7, and a mounted ball bearing 8. The motor 2, should preferably be an inverter-duty motor capable of rotating clockwise or counterclockwise. It should be noted that the motor 2 is connected to the drive reducer 3, which refers to a mechanical device used to reduce the rotational speed of a motor or engine while increasing its torque. The drive reducer 3 includes a base B that comprises i) a shaft coupling unit S1 that is adapted to couple with the shaft 4; and ii) one or more bolts or fasteners 9a-c that are adapted to secure the spacer 5 to the base B and to the rear wall 7b of the housing 7. The shaft 4, in turn, includes a first end 4a adapted to couple with the shaft coupling unit S1, a second end 4b adapted to couple with the shovel 6, wherein each end is opposite the other. The shaft 4 preferably comprises a cylindrical body; and may also include one or more protrusions 4c extending perpendicularly from the body of the shaft 4 adapted to assist in securing the shaft 4 to the rotating shovel 6.

The spacer 5 refers to a structure that is adapted to separate the motor 2 or the drive reducer 3 from the housing 7. Particularly, the spacer 5 includes a first end 5a, a second end 5b, one or more side walls 5c connecting the first end 5a to the second end 5b, and a hollow opening 5d that longitudinally crosses the first end 5a and the second end 5b of the spacer 5, wherein said hollow opening 5d is adapted to receive the shaft 4. In other words, the shaft 4 is inserted via the hollow opening 5d, such that the spacer 5 surrounds a portion of the body of the shaft 4. It should be noted that the first end 5a of the spacer 5 includes one or more openings adapted to receive the one or more bolts or fasteners 9a-c in order to secure the first end 5a of the spacer 5 to the base B of the drive reducer 3. Likewise, the second end of 5b the the spacer 5 includes one or more openings adapted to receive the one or more bolts or fasteners 9a-c in order to secure the second end 5b of the spacer 5 to the rear wall 7b of the housing 7. It should also be noted that the spacer 5 preferably has a cylindrical configuration; and that the side walls 5c of the spacer 5 may include one or more openings 5e adapted to provide ventilation to the shaft 4 within the spacer 5.

Figure 2:
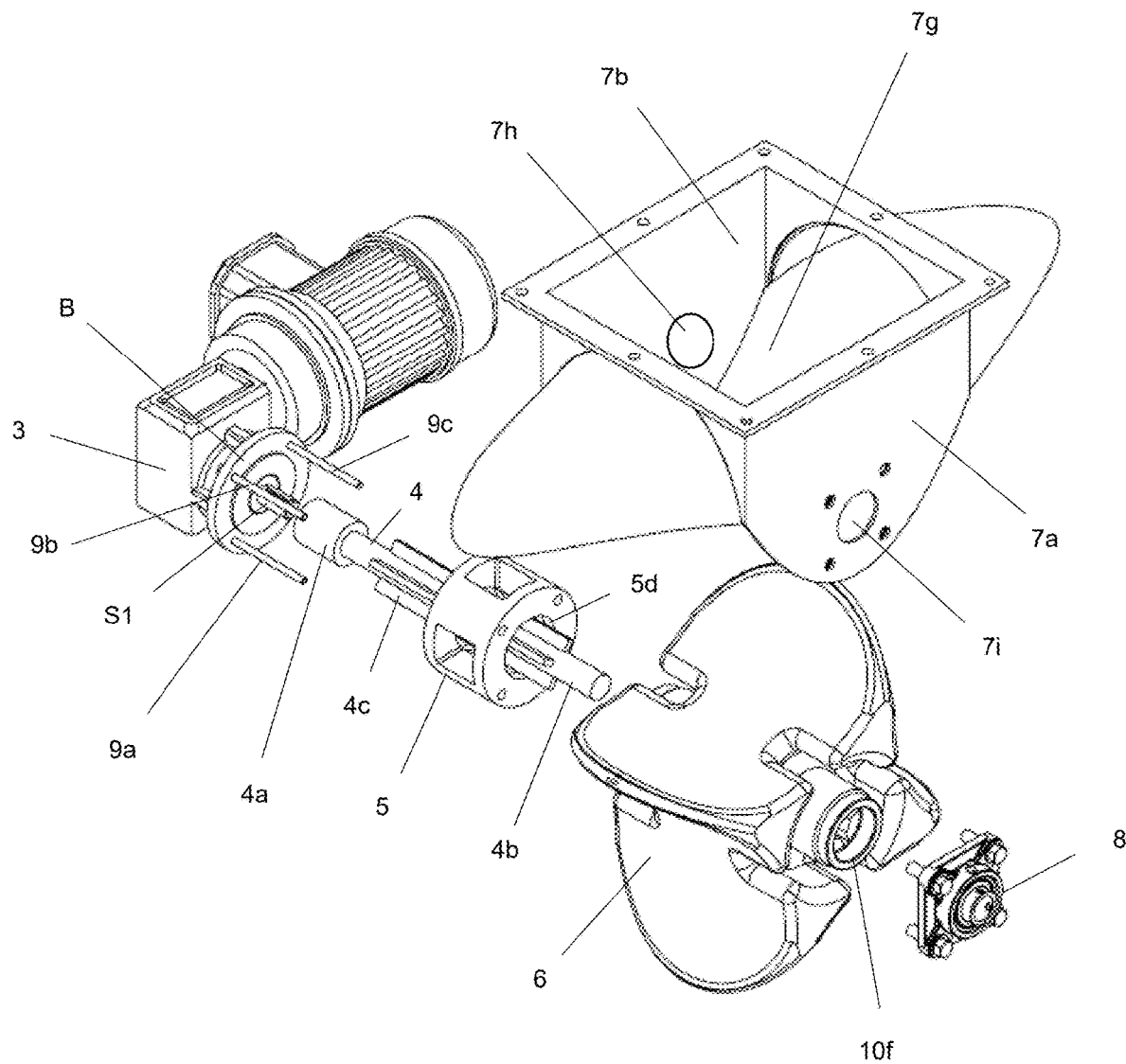
FIG. 2 shows an exploded view of the components of the dried sludge distribution system, in accordance with the principles of the present disclosure.
Figure 3:
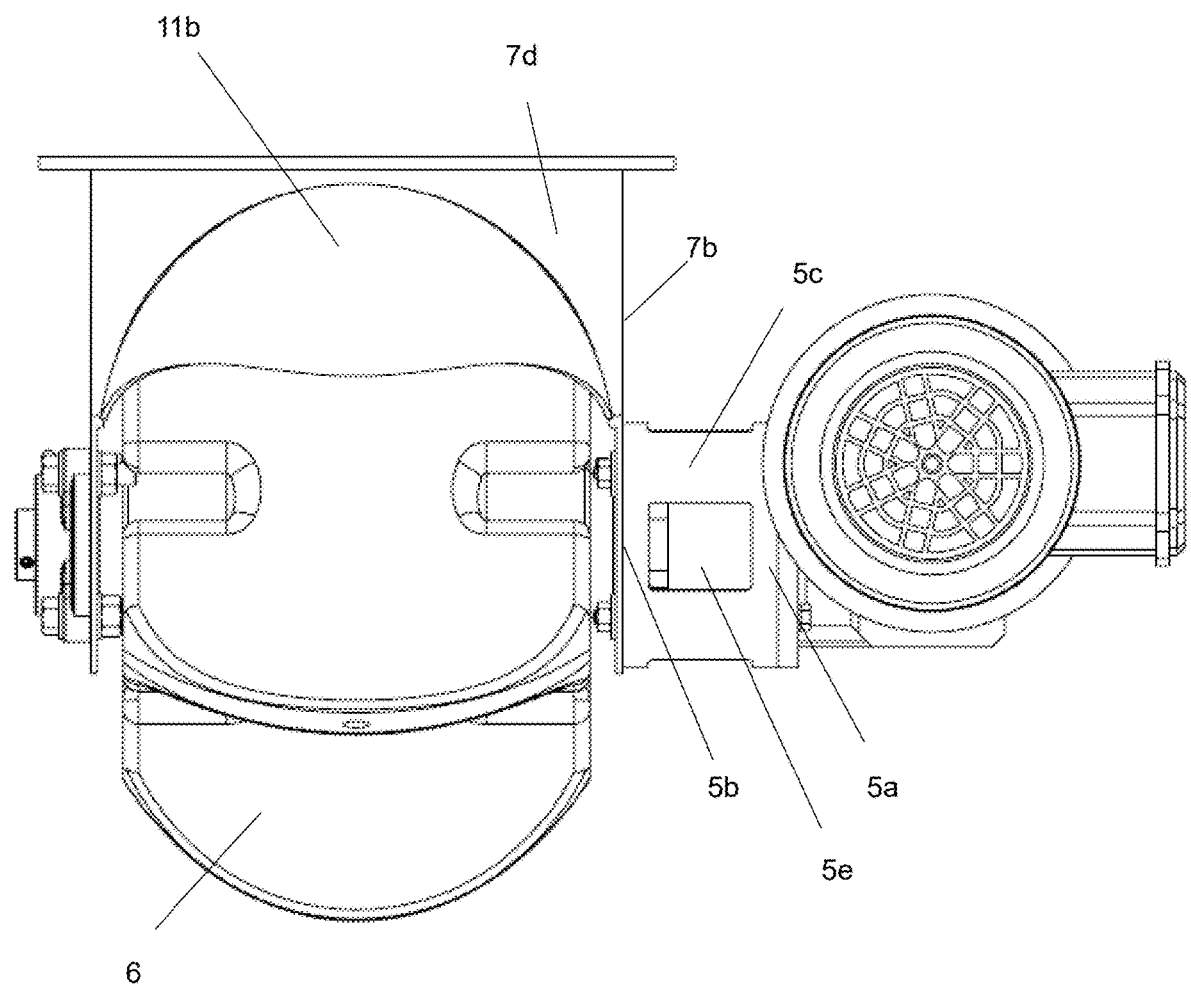
FIG. 3 shows a right-side view of the dried sludge distribution system, in accordance with the principles of the present disclosure.
Figure 4:
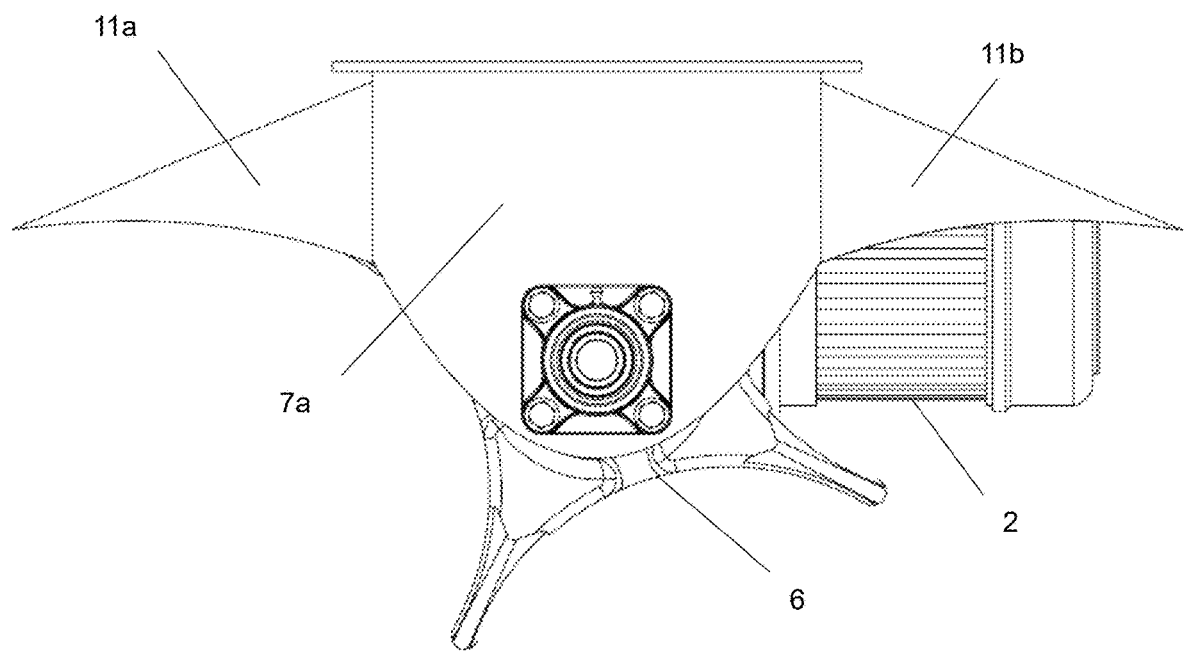
FIG. 4 shows a front view of the dried sludge distribution system, in accordance with the principles of the present disclosure.
Figure 5:
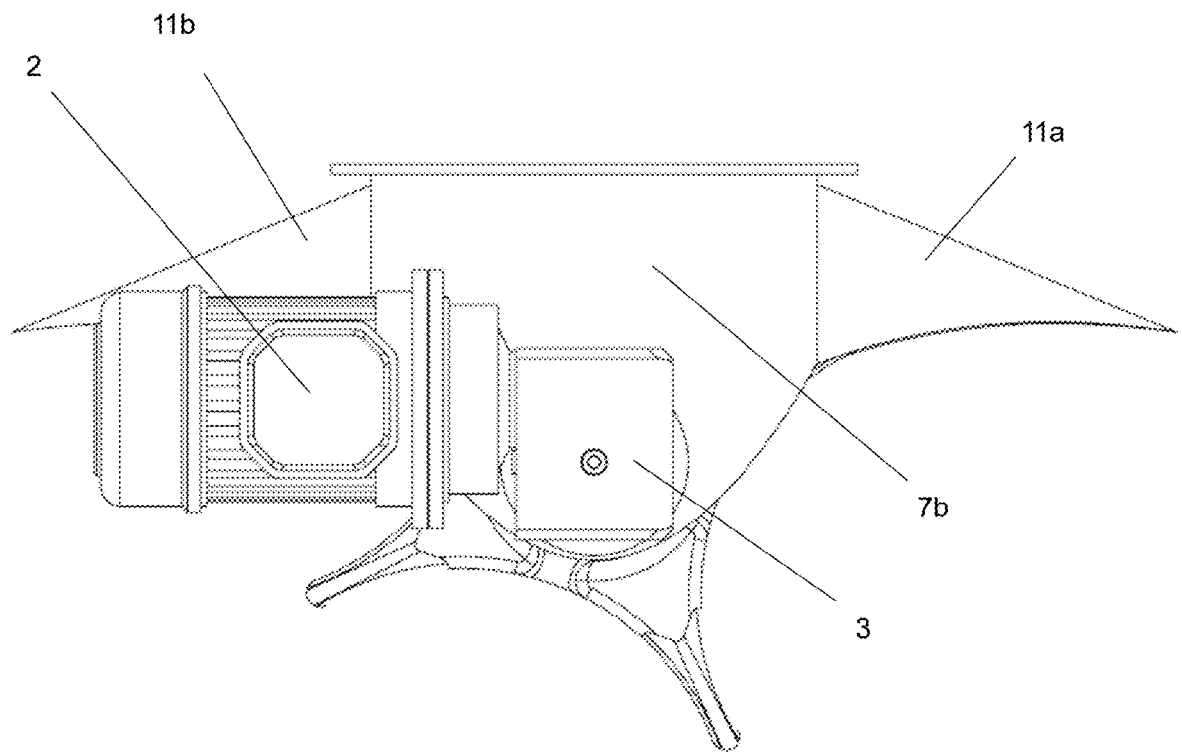
FIG. 5 shows a rear view of the dried sludge distribution system, in accordance with the principles of the present disclosure.
Figure 6:
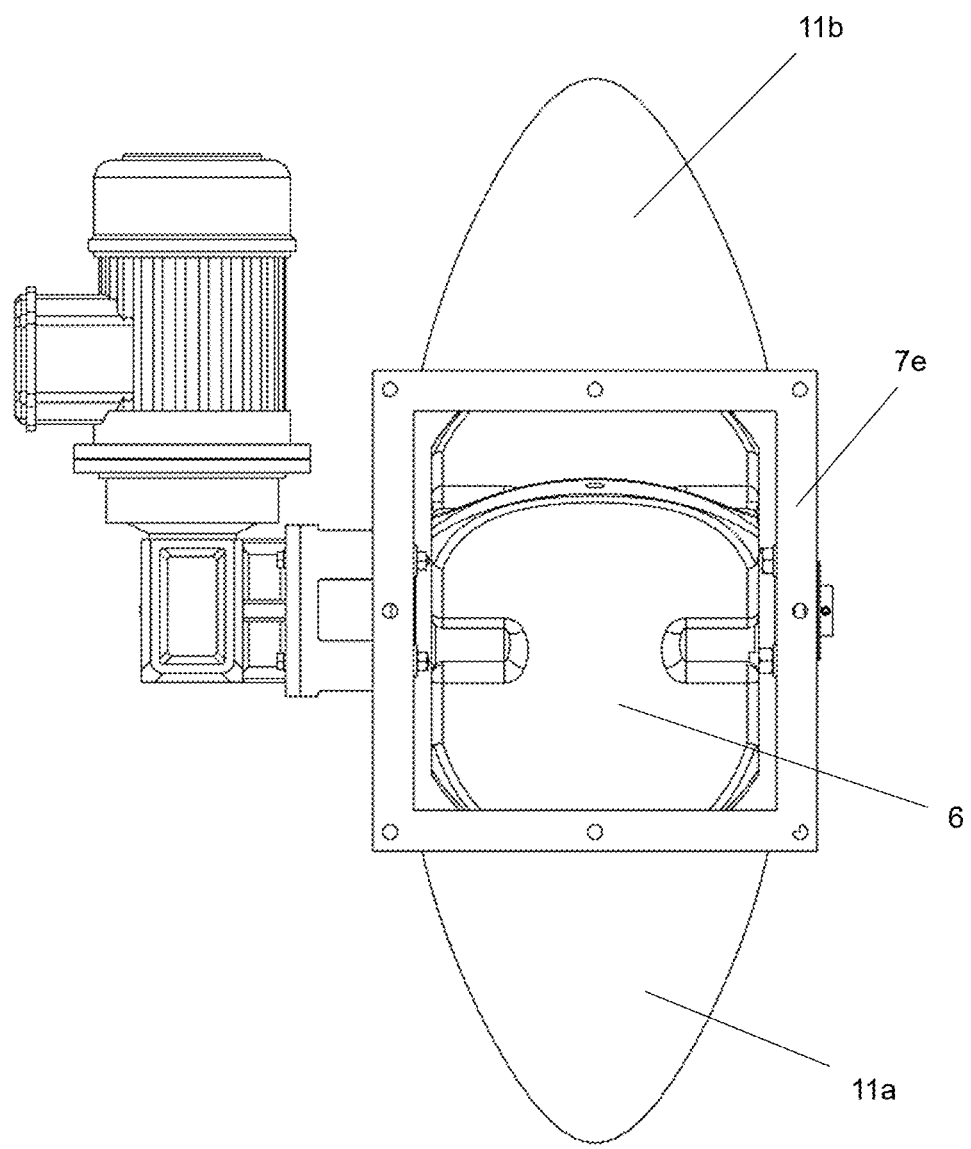
FIG. 6 shows a top view of the dried sludge distribution system, in accordance with the principles of the present disclosure.
Figure 7:
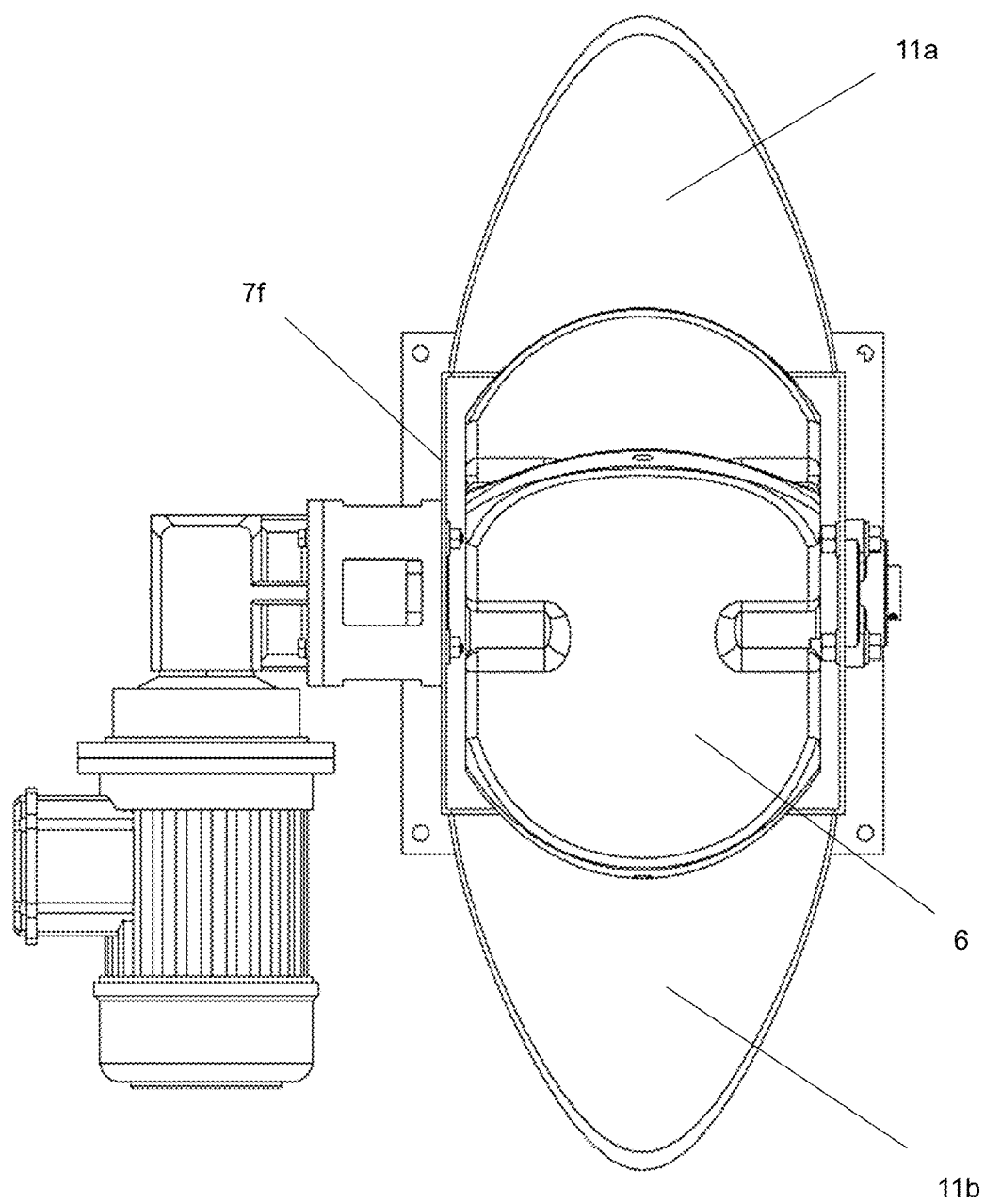
FIG. 7 shows a bottom view of the dried sludge distribution system, in accordance with the principles of the present disclosure.
Figure 8:
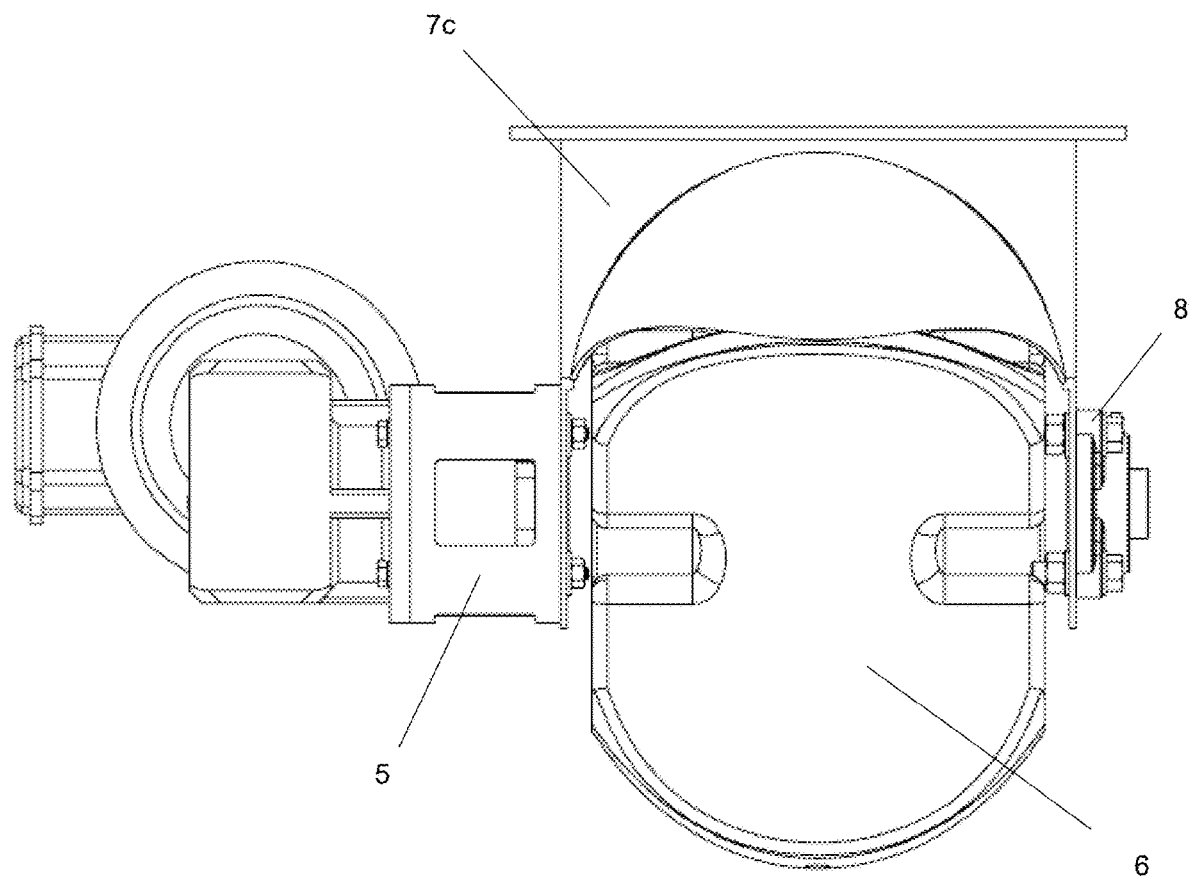
FIG. 8 shows a left-side view of the dried sludge distribution system, in accordance with the principles of the present disclosure.
Figure 9:
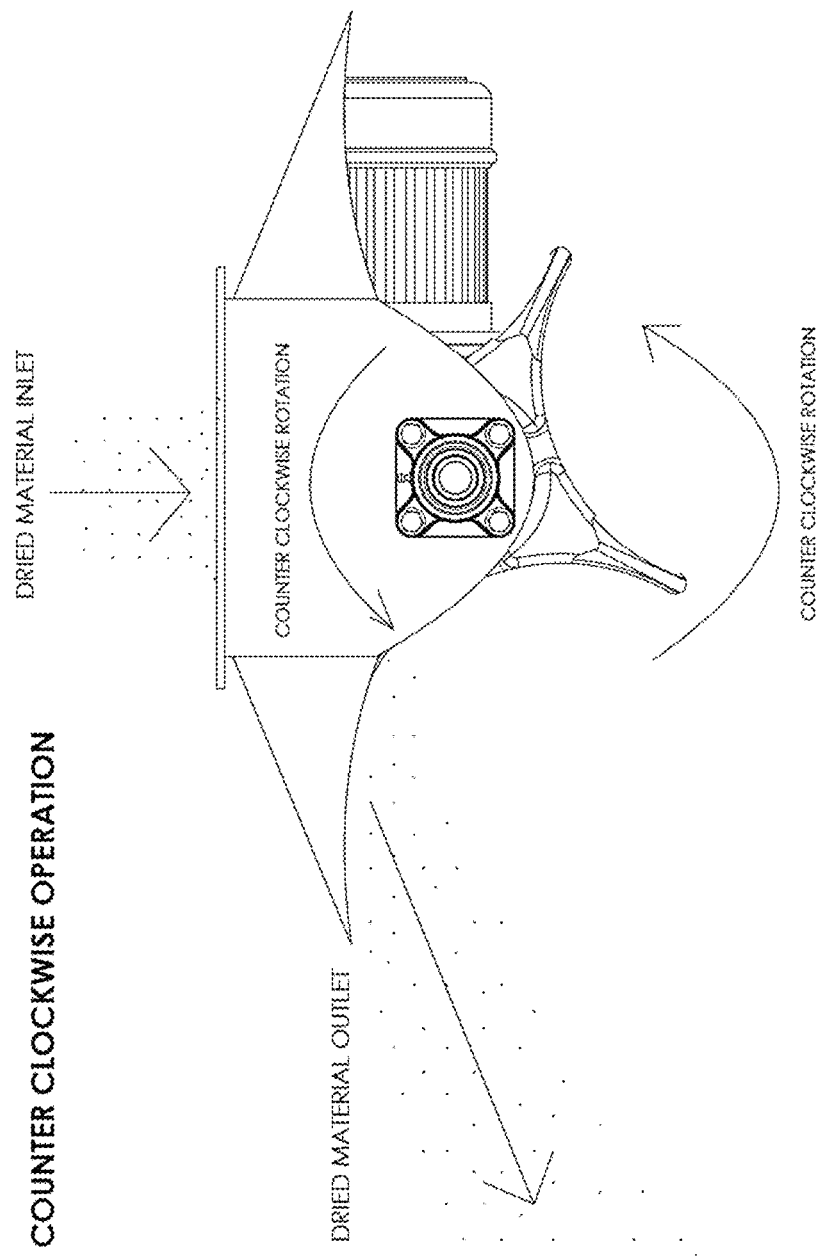
FIG. 9 shows the counterclockwise distribution of the dried sludge distribution system, in accordance with the principles of the present disclosure.
Figure 10:
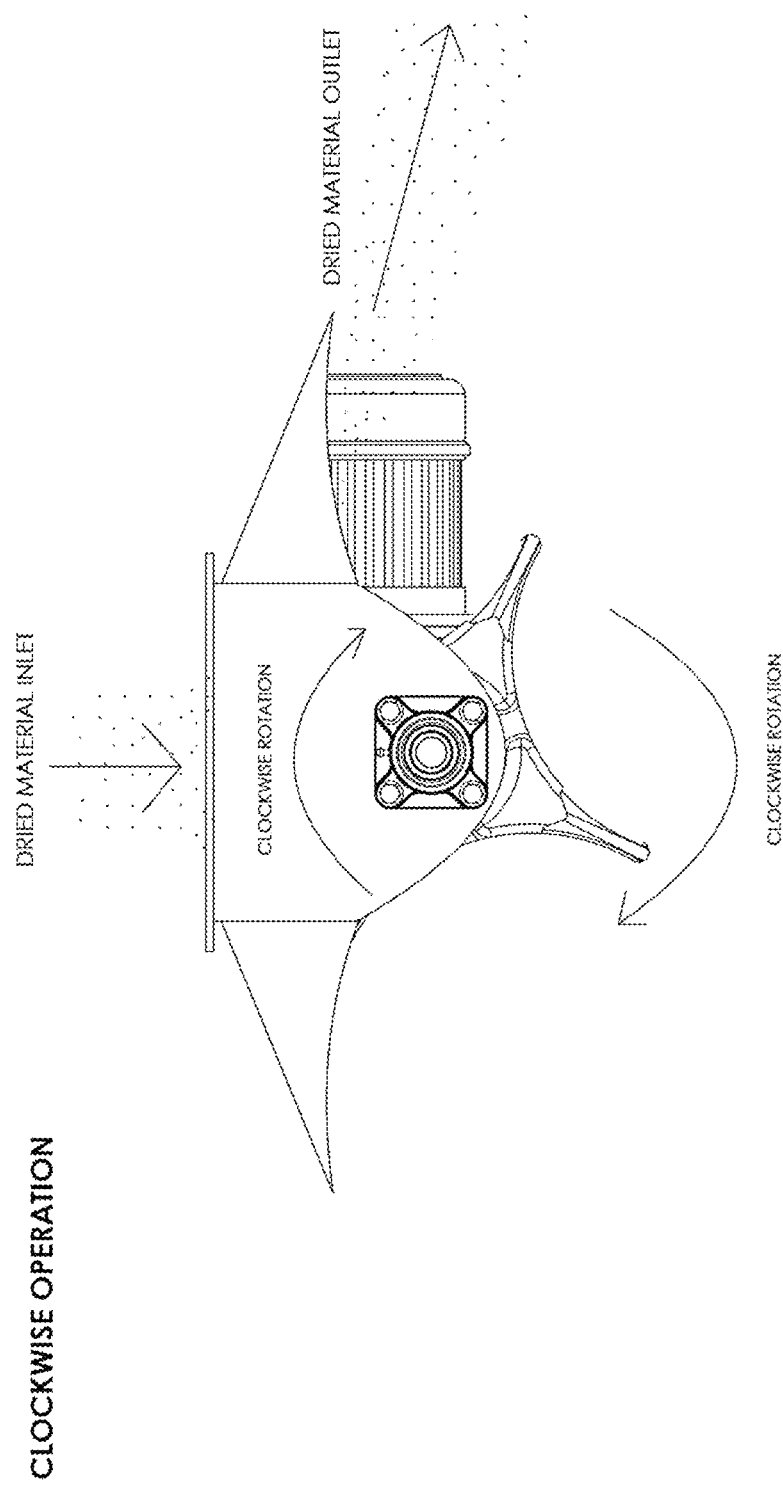
FIG. 10 shows the clockwise distribution of the dried sludge distribution system, in accordance with the principles of the present disclosure.
Figure 11:
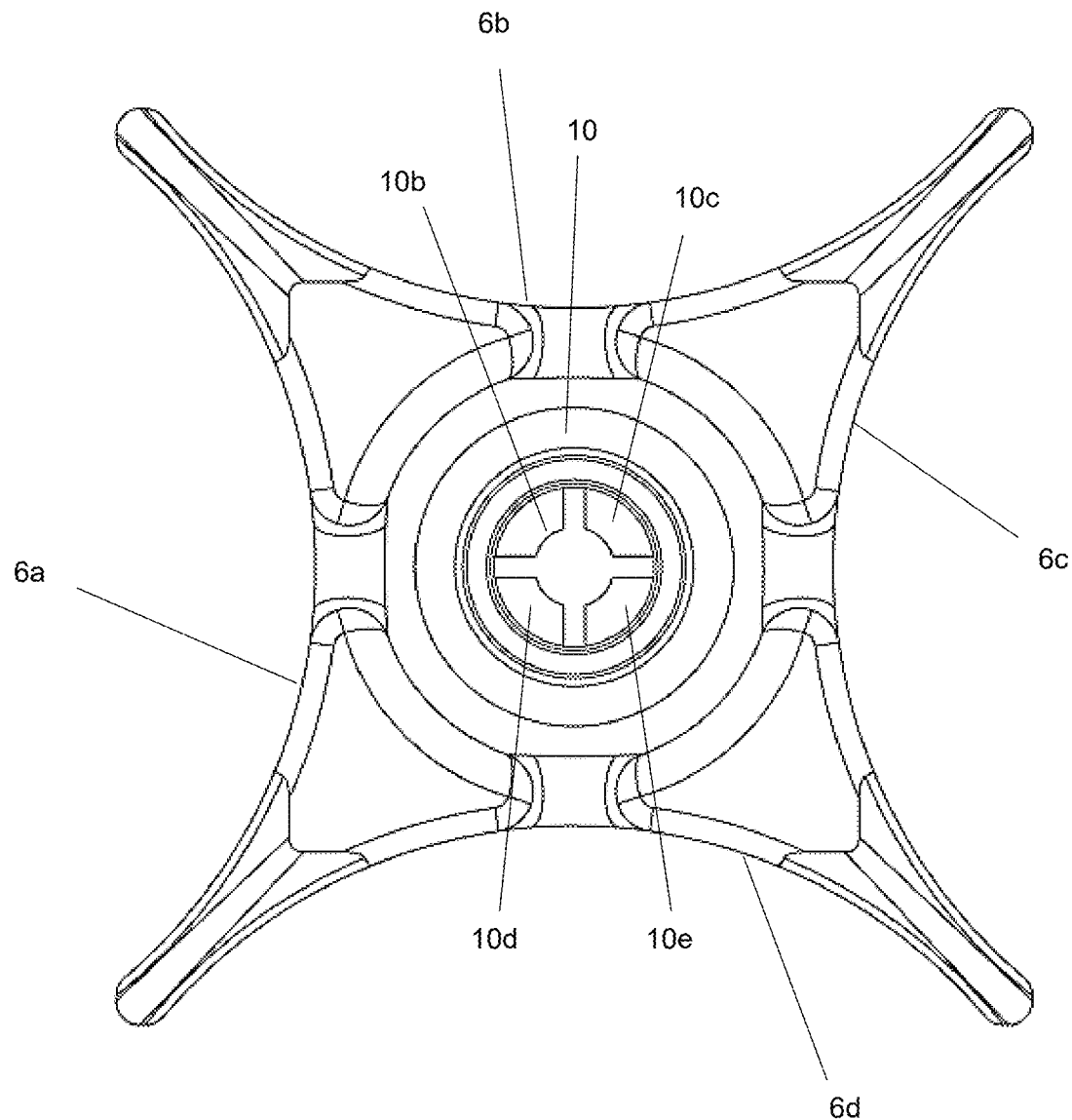
FIG. 11 shows the shovel component of the dried sludge distribution system, in accordance with the principles of the present disclosure.
Figure 12:
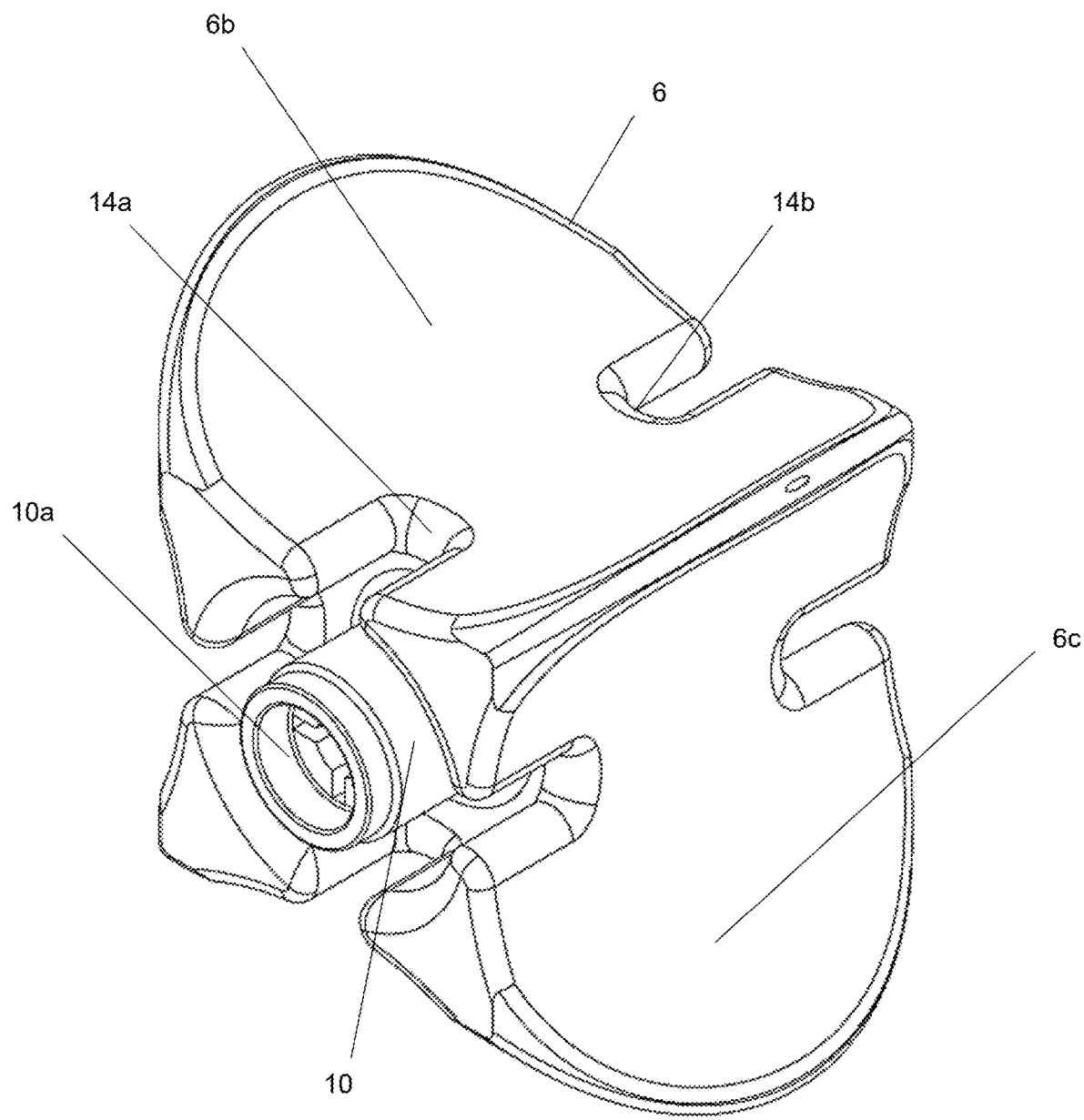
FIG. 12 shows a perspective view of the shovel component of the dried sludge distribution system, in accordance with the principles of the present disclosure.
Figure 13:
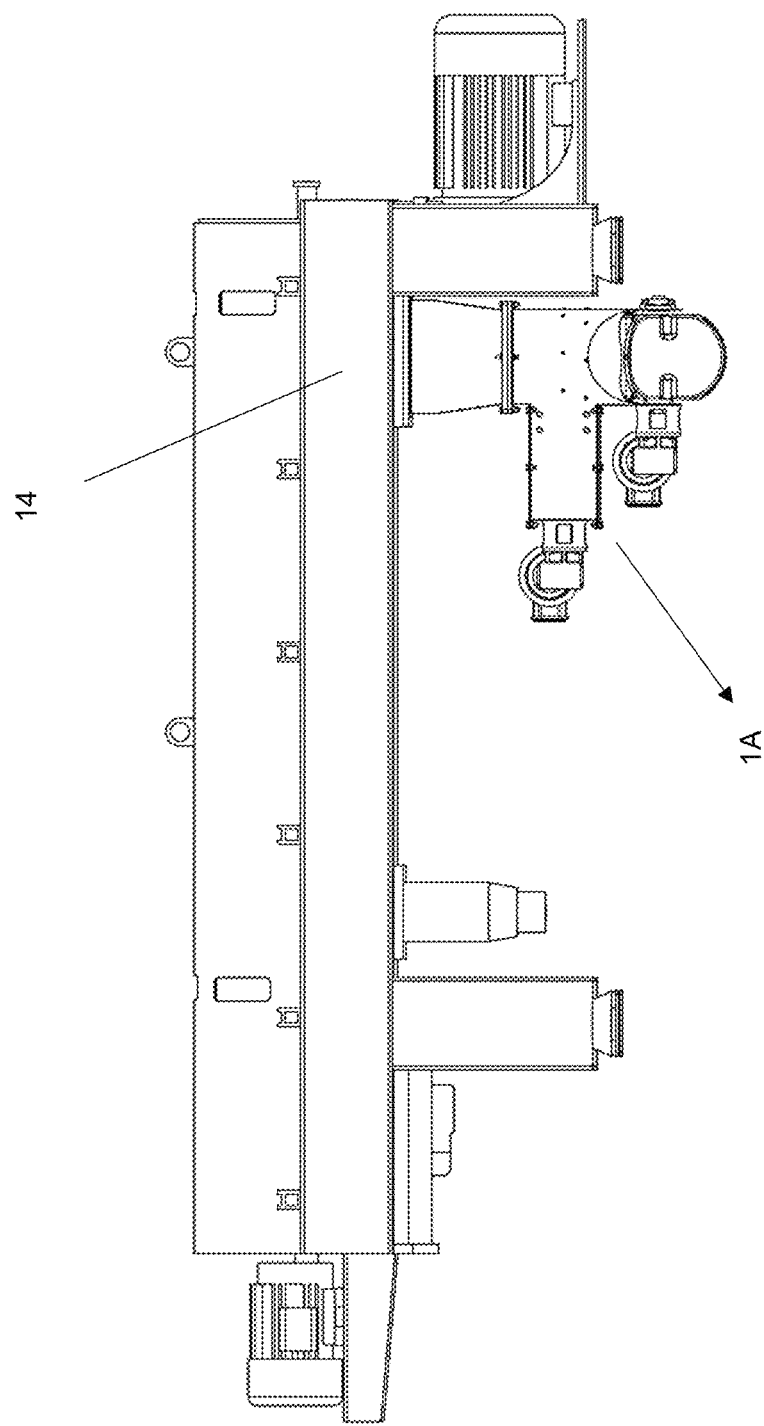
FIG. 13 shows a second embodiment of the dried sludge distribution system connected to a decanter or centrifuge, in accordance with the principles of the present disclosure.

The rotating shovel 6, on the other hand, comprises a central hollow cylinder 10 having a first end 10a adapted to receive the shaft 4 and to couple and engage with the one or more protrusions 4c extending perpendicularly from the body of the shaft 4, as shown in FIGS. 11 and 12. Particularly, the hollow center of the central hollow cylinder 10 includes one or more projections 10b-e that engage with the one or more protrusions 4c and thereby secure and lock in the second end 4b of the shaft 4 to the rotating shovel 6. The hollow cylinder 10 also includes a second end 10f opposite to the first end that is adapted to engage with the mounted ball bearing 8, as shown in FIG. 2. It should be noted that the rotating shovel 6 is located within the housing 7. Moreover, the rotating shovel 6 comprises one or more shoveling areas 6a-d extending perpendicularly from the central hollow cylinder 10, wherein said one or more shoveling areas 6a-d are interconnected with each other. Such interconnections define the several one or more shoveling areas 6a-d of the rotating shovel 6 and are in charge of scooping or directing the dried sludge during to the desired location during rotation of the shovel 6. Each of the shoveling areas 6a-d may include one or more indentations 14a-b to facilitate rotation of the shovel 6 within the housing 7. In one embodiment of the subject disclosure, the housing 7 may be a hopper. It should be noted that actuation of the motor 2, causes the shaft 4 to rotate, which, in turn, causes the shovel 6 to rotate and to direct the dried sludge or dirt towards the direction of rotation of the rotating shovel 6, as shown in FIGS. 9 and 10.

Figure 20:
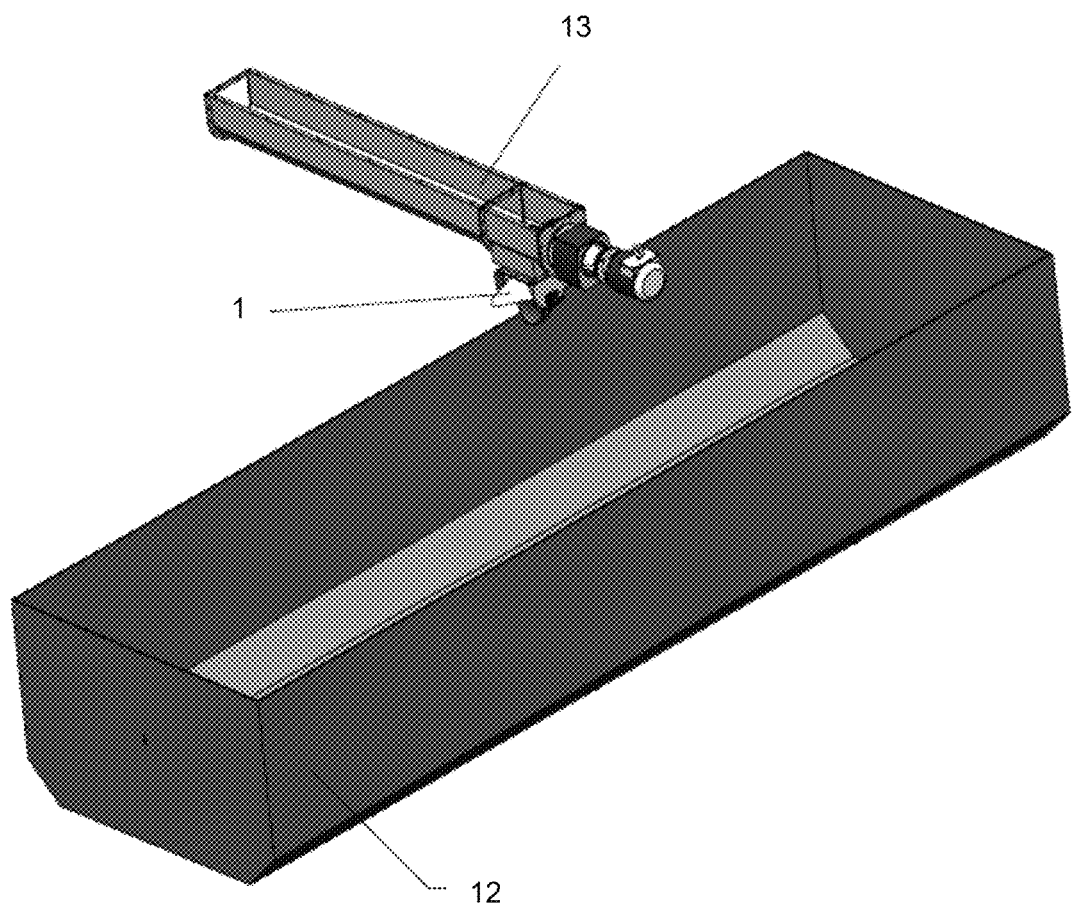
FIG. 20 shows the the dried sludge distribution system connected to a conveyor system, in accordance with the principles of the present disclosure.

As shown in FIGS. 1-8, the housing 7 is preferably rectangular and includes a front wall 7a, a rear wall 7b, a first side wall 7c, and a second side wall 7d, wherein the first and second side walls connect the front wall 7a to the rear wall 7b. The housing 7 also includes an open-ended top 7e and an open-ended bottom 7f opposite each other, thereby defining an interior volume 7g on the center of the housing 7. The open-ended top 7e is adapted to receive dried sludge or other similar particulate matter, the interior volume 7g is adapted to accommodate the rotating shovel 6; and the open-ended bottom 7f is adapted to allow the dried sludge to be directed towards the desired area by the rotating shovel 6. It should be noted that the first wall 7c and the second wall 7d of the housing 7 include a first cover 11a and a second cover 11b, respectively, adapted to redirect the dried sludge that is being scooped by the rotating shovel 6. Particularly, the first cover 11a on the first wall 7c and the second cover 11b on the second wall 7d prevent the dried sludge from being expelled upwards as the rotating shovel 6 rotates and performs its scooping function. Rather, during the operation of the rotating shovel 6, the dried substance will hit or strike the corresponding cover 11a or 11b, causing the dried substance to be deflected into a container 12 beneath the dried sludge distribution system 1, as shown in FIG. 20. It should be noted that the first cover 11a extends perpendicularly from the first side wall 7c and preferably has a semi-circular or dome shape. Likewise, the second cover 11b extends perpendicularly from the second side wall 7d and preferably has a semi-circular shape. It is important to note that the higher the revolutions per minute of the shovel 6, the farther the dried substance will be expelled from the rotating shovel 6. Conversely, decreasing the revolutions per minute of shovel 6 results in the dried substance being expelled closer to the rotating shovel 6. Also, the direction in which the shovel 6 is rotating will determine whether the dried substance will be expelled via the first cover 11a or via the second cover 11b. As shown in FIG. 9, the counterclockwise rotation of the shovel 6 causes the be expelled via the first cover 11a; and as shown in FIG. 10, the clockwise rotation of the shovel 6 causes the dried substance to be expelled via the second cover 11b.

As shown in FIG. 2, the rear wall 7b of the housing 7 includes an opening 7h adapted to receive the shaft 4, so that the shaft can reach and couple to the first end of the central hollow cylinder 10 of the rotating shovel 6. The front wall 7a of the housing 7, on the other hand, includes an opening 7i adapted to permit the opposite second end of the central hollow cylinder 10 of the rotating shovel 6 to be secured to the mounted ball bearing 8. The mounted ball bearing 8, in turn, is secured to the front wall 7a of the housing 7 via one or more bolts or fasteners. To achieve this, the front wall 7a of the housing 7 further includes one or more holes adapted to receive the one or more bolts or fasteners. Lastly, it should be that the housing 7 may be attached to the end of a conveyor system 13 via either of the front wall 7a, the rear wall 7b, the first side wall 7c, or the second side wall 7d of the housing 7, as shown in FIG. 20.

Figure 22:
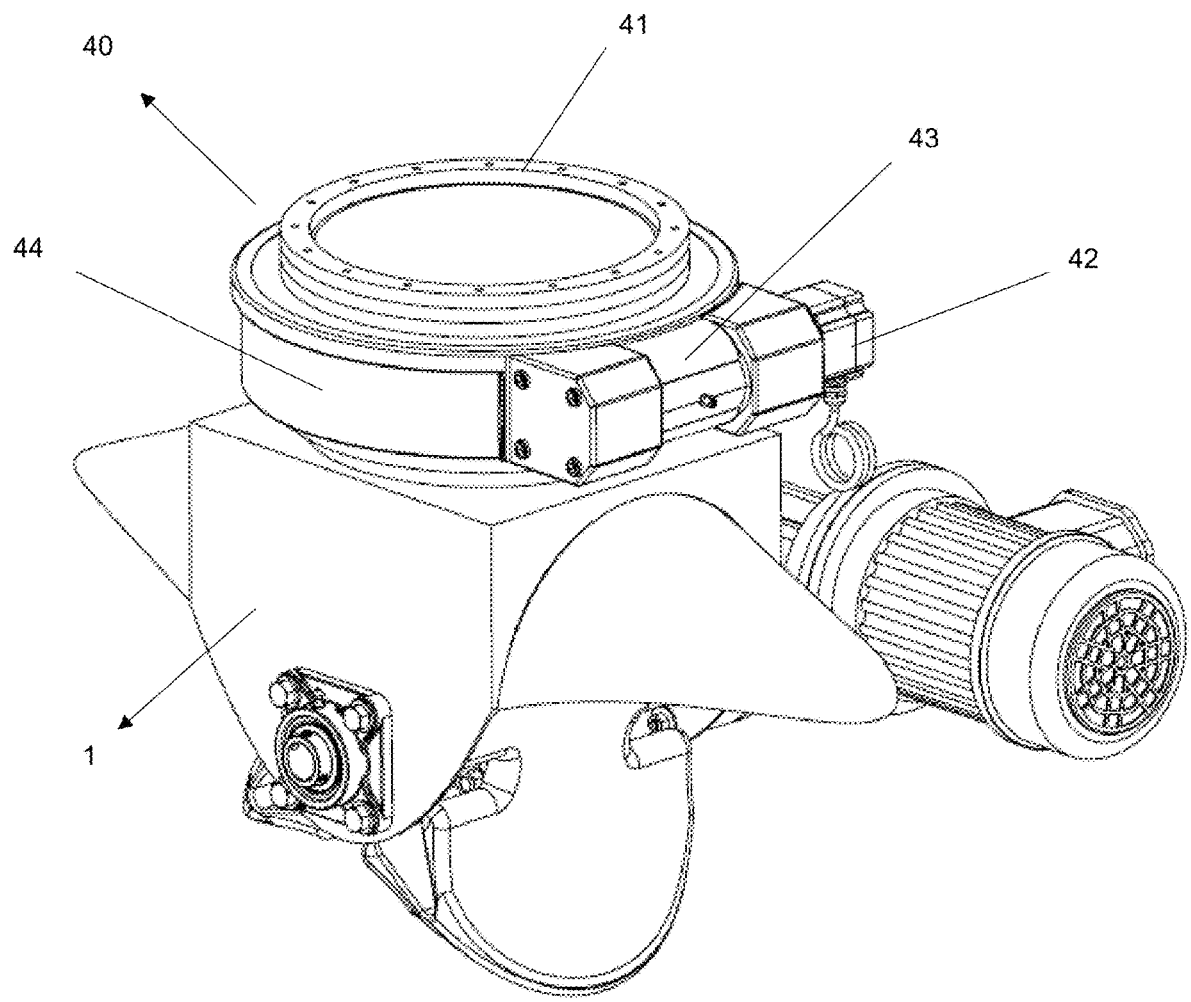
FIG. 22 shows the dried sludge distribution system attached to a slew drive, in accordance with the principles of the present disclosure.
Figure 23:
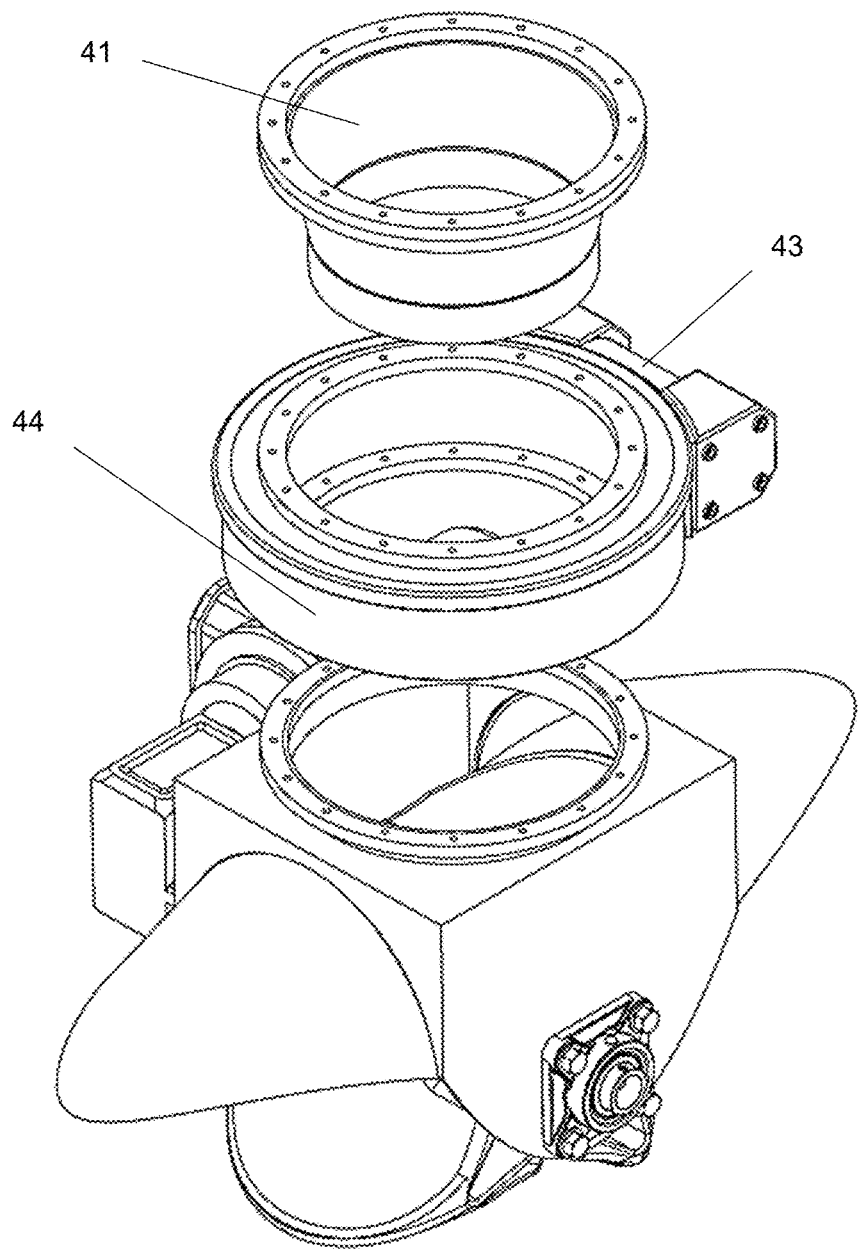
FIG. 23 shows an exploded view of the components of the slew drive, in accordance with the principles of the present disclosure.
Figure 24:
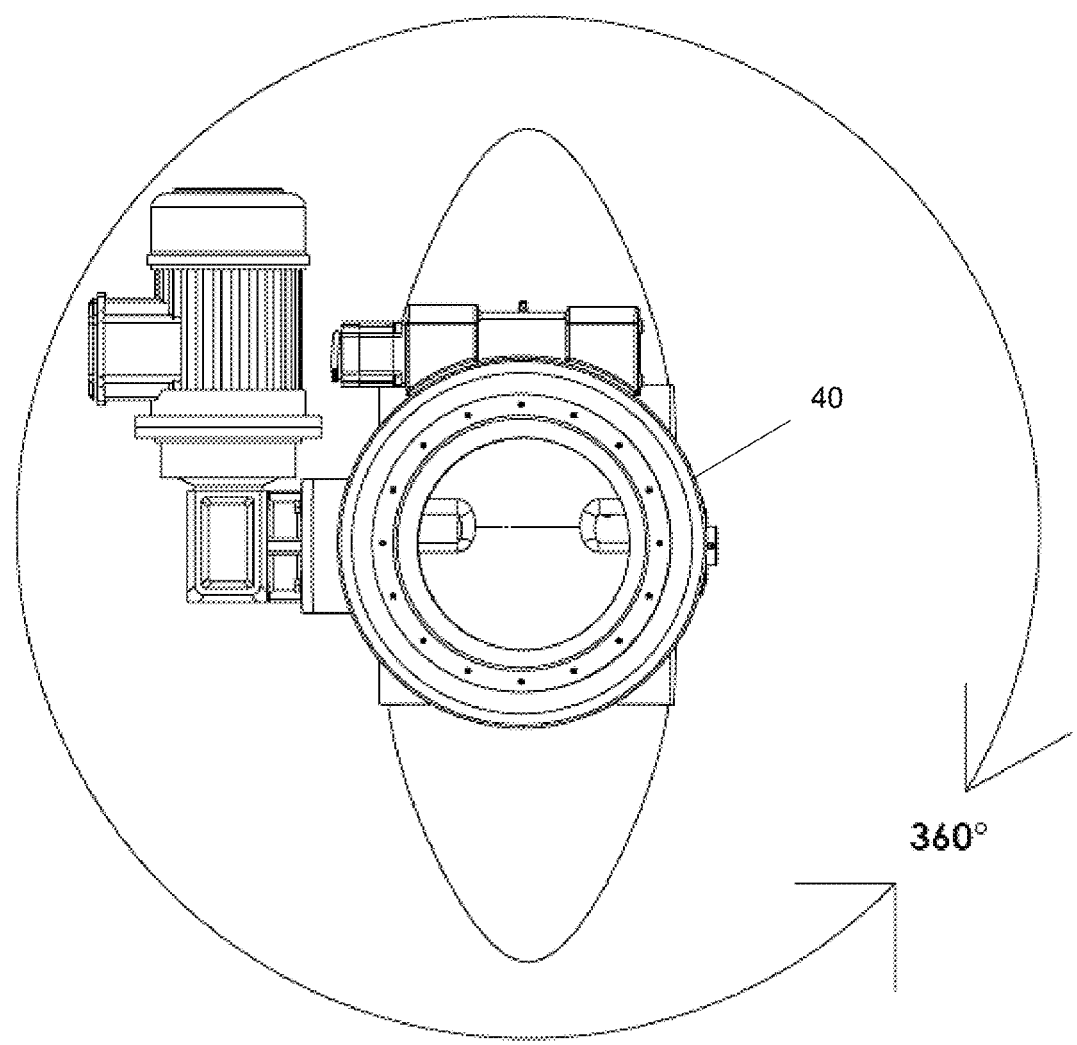
FIG. 24 shows the rotation of the dried sludge distribution system attached to a slew drive, in accordance with the principles of the present disclosure.

It should be noted that in the dried sludge distribution system 1, the open-ended top 7e of the housing 7 may be connected, via one or more bolts, to a slew drive 40, as shown in FIGS. 22 and 23. A slew drive is a gearbox designed to handle radial or axial loads using high rotational torque. The slew drive 40 (also commonly referred to as slewing gear, slew bearings, worm gears, or worm drives) comprises a ball or roller slewing ring bearing 41, a drive motor 42 attached to a threaded shaft drive 43, and a housing 44. The slewing ring bearing 41 comprises a plurality of teeth (not shown), and the threaded shaft drive 43 comprises a plurality of grooves (not shown) adapted to interact with and receive the teeth of the slewing ring bearing. The housing 44, in turn, is adapted to house the drive motor 42, the slewing ring bearing 41, and the threaded shaft drive 43. In operation, the slew drive's axial movement, or motion around its axis, interacts to create radial torque. The action occurs by meshing the grooves of the threaded shaft drive with the teeth of the slewing ring bearing. While turning, the worm gear's axial movement transfers magnified torque force to the radial gear. The number of threads on the horizontal screw and the number of gears that interact will determine the speed ratio of the setup. The slew drive 40 may be fixedly attached to the end of a conveyor system and this, in turn, allows the dried sludge distribution system 1, to rotate 360 degrees as shown in FIG. 24, thereby allowing a user of the system to direct or disperse the dried sludge to the user's desired location.

In a second embodiment of the subject disclosure, shown in FIGS. 13-16, the dried sludge distribution system 1A includes a diverter gate 15 that enables the dried sludge distribution system 1A to be incorporated into a centrifuge decanter 14. In this embodiment, the housing 7' includes larger first and second side walls (7c', 7d' respectively); larger front and rear walls (7a', 7b' respectively); an open-ended top 7e'; and an open-ended bottom 7f' opposite the open-ended top 7e', thereby defining an interior volume 7g' on the center of the housing 7'. The open-ended top 7e' is adapted to receive dried sludge or other similar particulate matter, the interior volume 7g' is adapted to accommodate the rotating shovel 6'; and the open-ended bottom 7f' is adapted to allow the dried sludge to be directed towards the desired area by the rotating shovel 6'. It should be noted that the first wall 7c' and the second wall 7d' include a first cover 11a' and a second cover 11b', respectively, adapted to redirect the dried sludge that is being scooped by the rotating shovel 6'.

Figure 14:
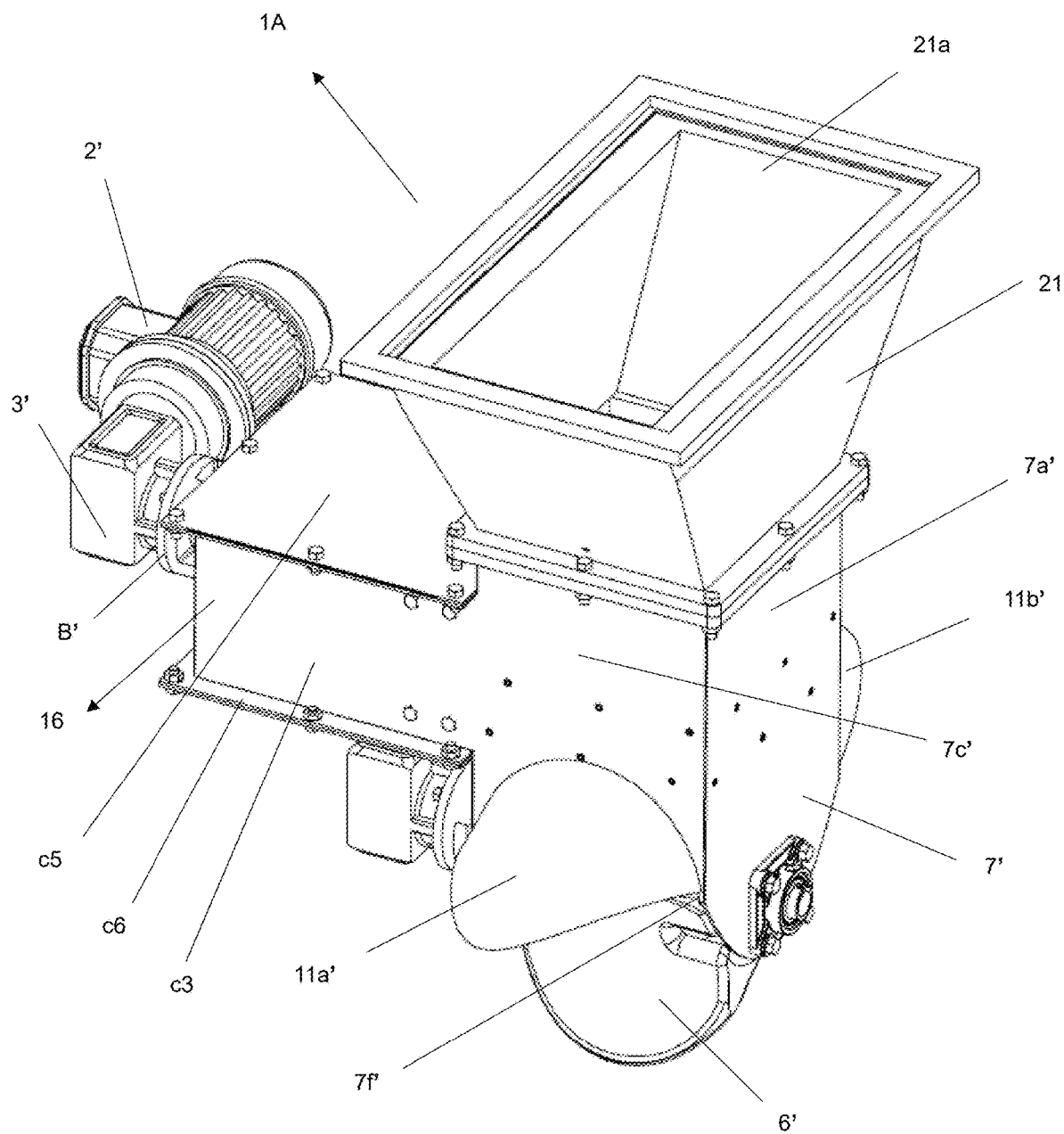
FIG. 14 shows the second embodiment of the dried sludge distribution system, in accordance with the principles of the present disclosure.
Figure 15A:
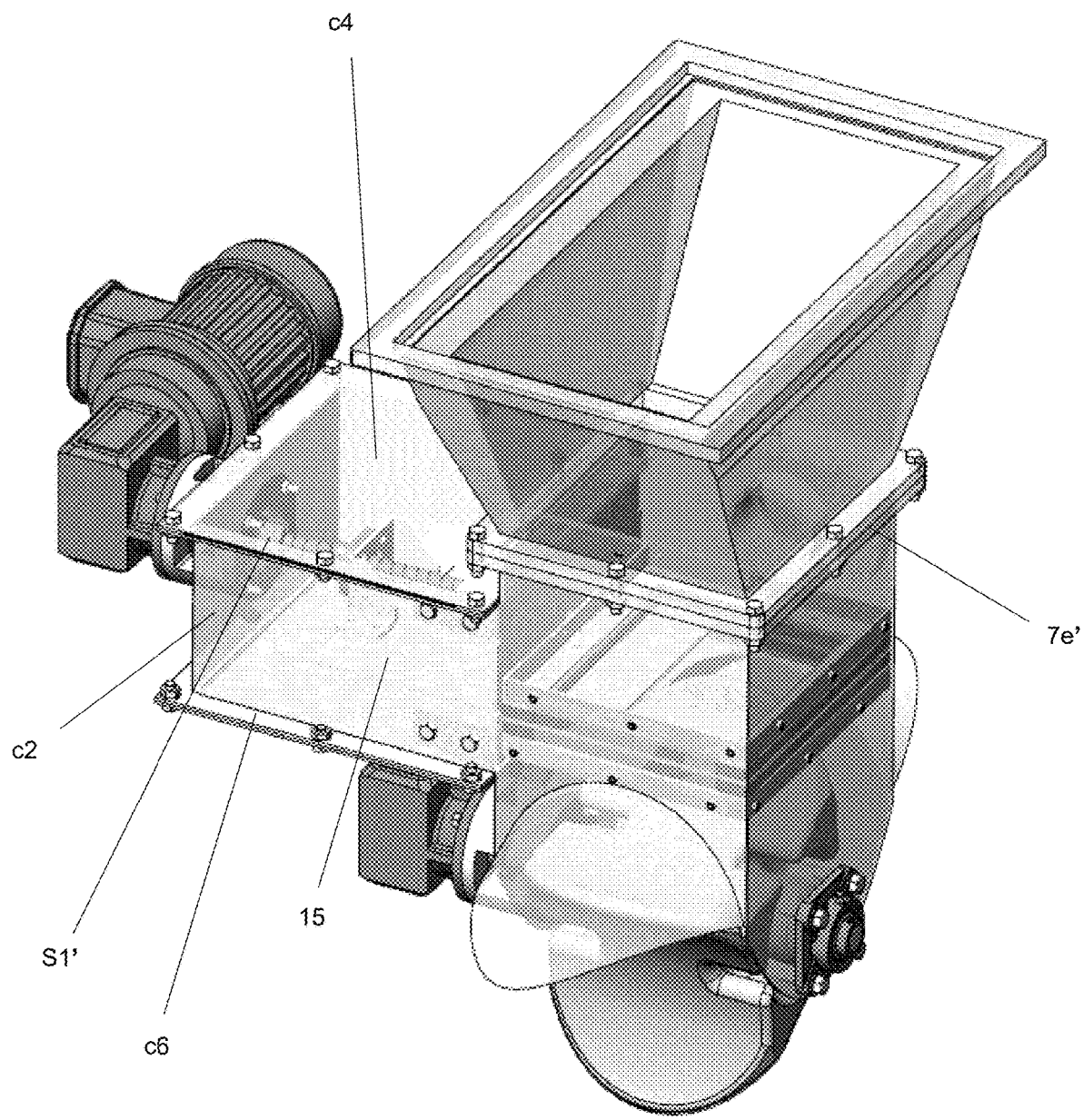
FIGS. 15A-B show the internal components of the second embodiment of the dried sludge distribution system, in accordance with the principles of the present disclosure.
Figure 15B:
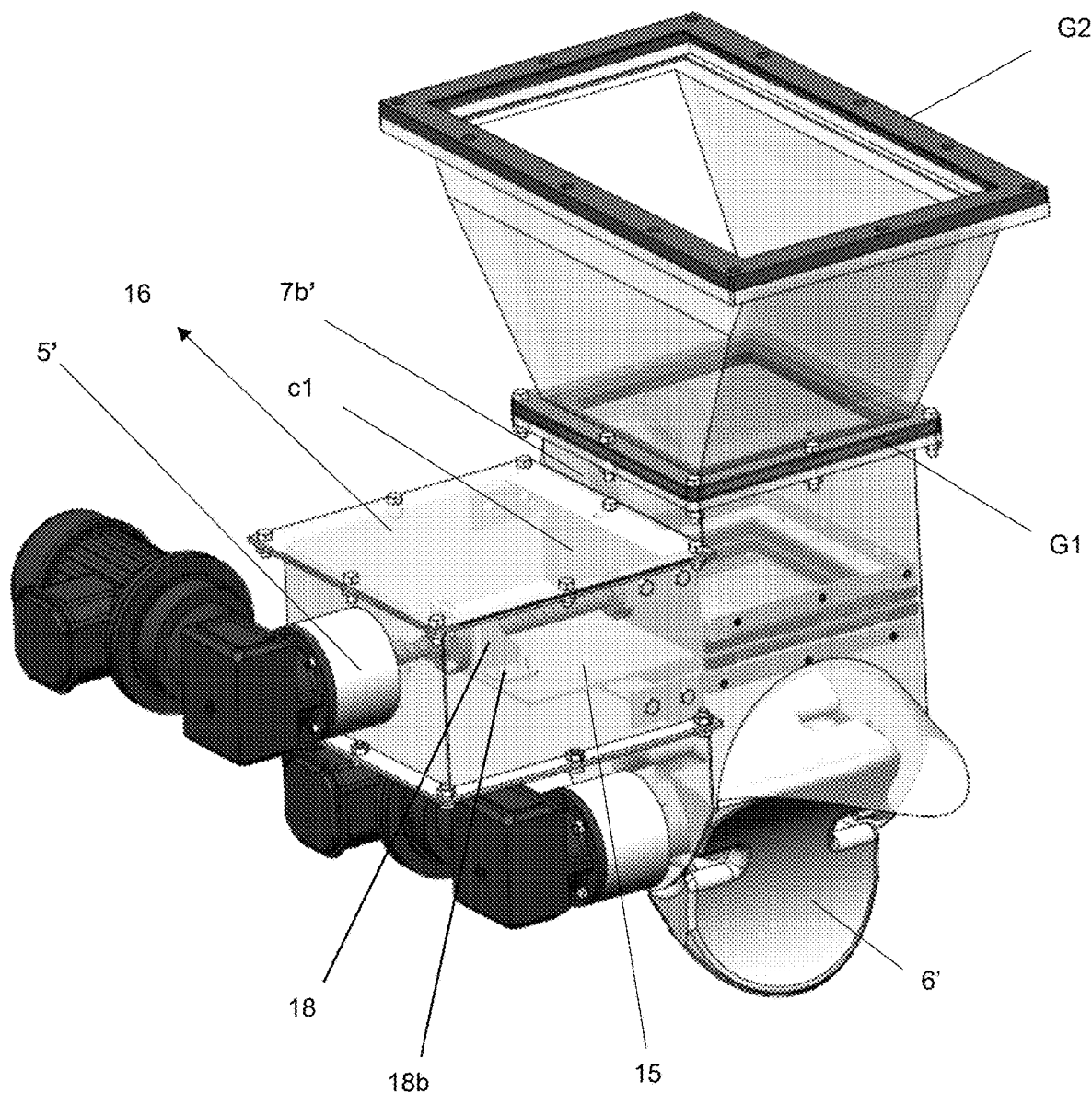
Figure 16:
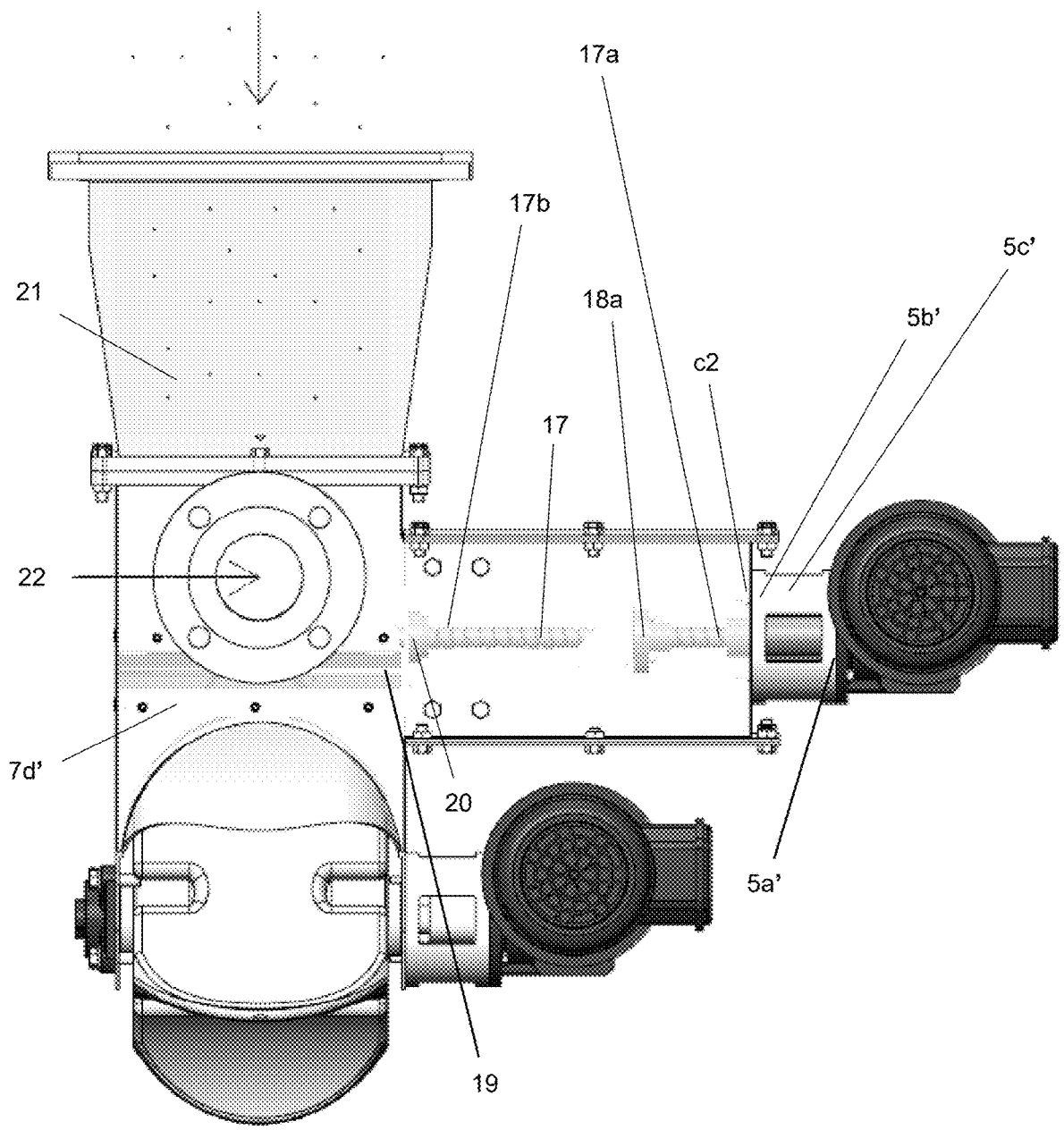
FIG. 16 shows a side view of the second embodiment of the dried sludge distribution system, in accordance with the principles of the present disclosure.
Figure 17:
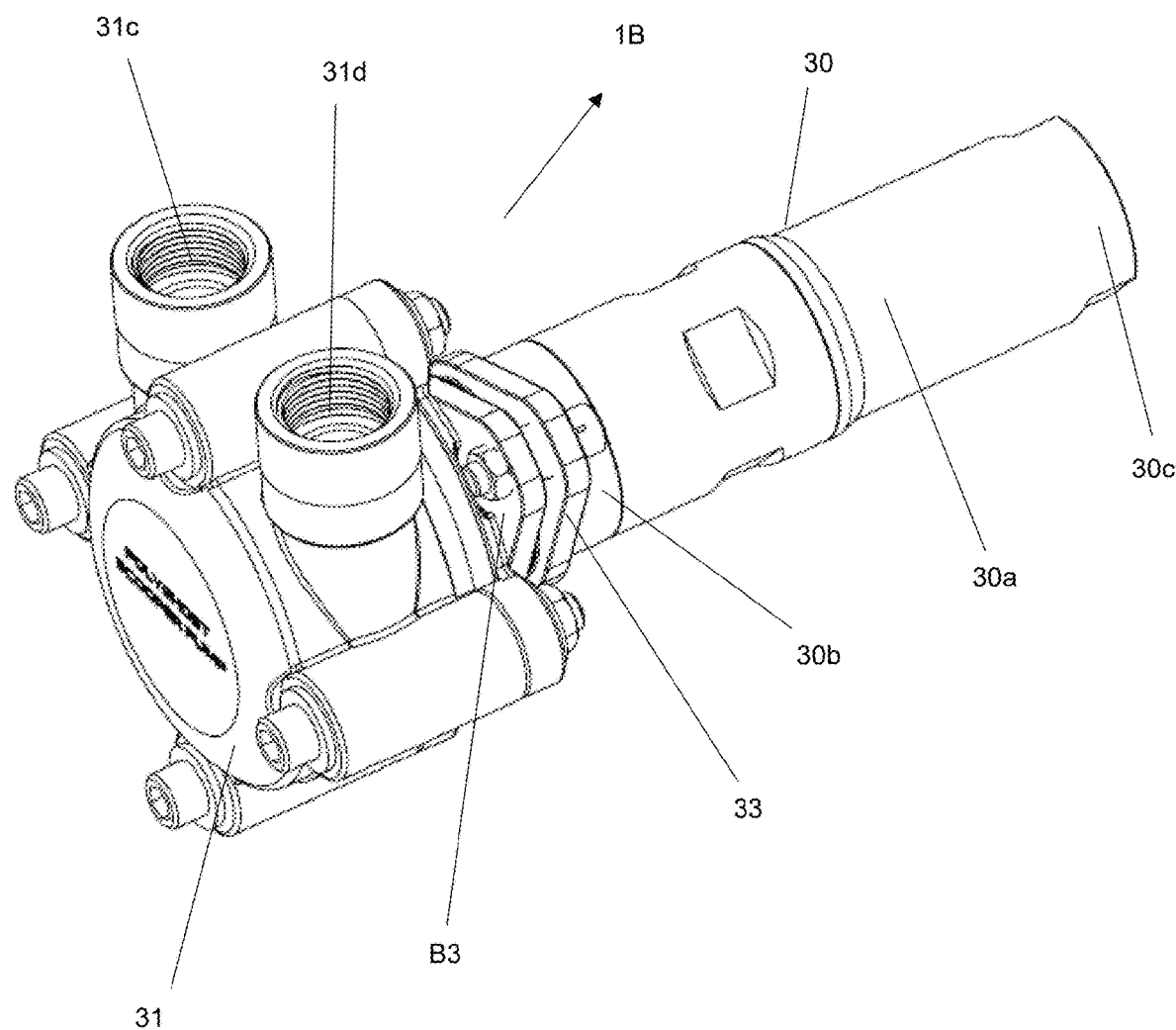
FIG. 17 shows a submersible pneumatic pump version of the dried sludge distribution system, in accordance with the principles of the present disclosure.
Figure 18:
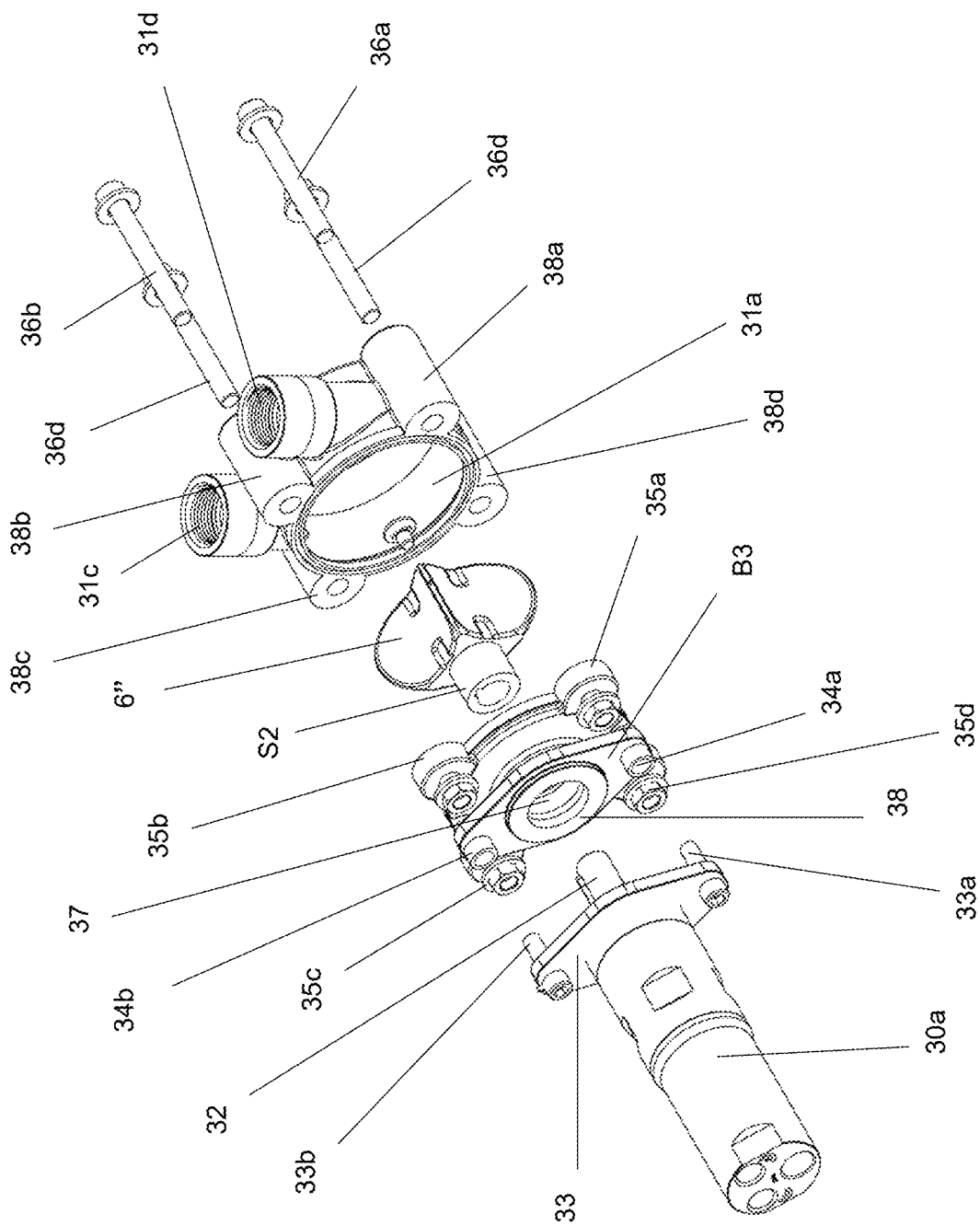
FIG. 18 shows an exploded view of the submersible pneumatic pump version of the dried sludge distribution system, in accordance with the principles of the present disclosure.

Moreover, as shown in FIG. 14, the open-ended top 7e' of the housing 7' may be connected, via one or more bolts or fasteners, to a hopper 21 that is also adapted to receive dried sludge from the decanter or centrifuge 14 and direct it towards the interior volume of the housing 7' and ultimately towards the rotating shovel 6'. The open-ended top 7e' may include a flange with one or more openings adapted to receive bolts or fasteners to secure or connect the top end 7e' of the housing 7' to the exit of the hopper 21. It should be noted that the hopper 21 is an inverted pyramidal container designed to lead the dried sludge toward the interior volume of the housing 7'. The hopper 21 includes an open-ended entrance 21a that is adapted to connect to the exit of the decanter or centrifuge 14; and an open-ended exit 21b that is adapted to connect to the open-ended top 7e' of the housing 7, wherein the open-ended top 21a has a greater length and width than the open-ended bottom 21b (i.e., an inverted pyramidal container). The open-ended top 21a may include a flange adapted to receive one or more bolts to secure the top of the hopper 21 to the sludge exit of the centrifuge decanter 14. Similarly, the open-ended bottom 21b may include a flange adapted to receive one or more bolts to secure the bottom of the hopper 21 the open-ended top 7e' of the housing 7. A rubber gasket G1 may be placed between the open-ended bottom 21b of the hopper 21 with the open-ended top 7e' of the housing 7' to prevent any leakage. Likewise, a rubber gasket G2 may be placed between the open-ended top 21a of the hopper 21 with the sludge exit of the centrifuge decanter 14 to prevent any leakage. It should be noted that the first side wall 7c', the second side wall 7d', or the front wall 7a' of the housing 7' may include a drain port 22 adapted to release wet sludge arriving from the centrifuge decanter 14.

Moreover, the housing 7' includes a diverter gate storage compartment 16 connected to an upper portion of the rear wall 7b', wherein said storage compartment 16 is adapted to house the diverter gate 15 along with a precision lead screw 17. The precision lead screw 17, in turn, is adapted to control the movement of the diverter gate 15. It should be noted that the diverter gate storage compartment 16 comprises a front wall c1 and a rear wall c2 opposite each other; a first side wall c3 and a second side wall c4 opposite each other; and a top end c5 and a bottom end c6 opposite each other, wherein the first side wall c3 and the second side wall c4 connect the front and rear walls to each other; and wherein the front wall c1, rear wall c2, first side wall c3, and second side wall c4 of the diverter gate storage compartment 16 are flanked by the top end c5 and the bottom end c6. In other words, the front wall c1, rear wall c2, first side wall c3, and second side wall c4 are perpendicularly connected to the top end c5 and to the bottom end c6.

The dried sludge distribution system 1A also includes a second motor 2' that should preferably be an inverter-duty motor capable of rotating clockwise or counterclockwise. The second motor 2' is connected to a second drive reducer 3', which includes a base B' that comprises a coupling unit S1' that is adapted to couple with the precision lead screw 17. The dried sludge distribution system 1A further includes a second spacer 5' between the base B' of the drive reducer 3' and the rear wall c2 of the diverter gate storage compartment 16. Specifically, the base B' includes one or more bolts or fasteners that are adapted to secure the second spacer 5' to the base B' and to the rear wall c2 of the storage compartment 16. The second spacer 5' includes a first end 5a', a second end 5b', one or more side walls 5c' connecting the first end 5a' to the second end 5b', and a hollow opening that longitudinally crosses the first end 5a' and the second end 5b' of the second spacer 5', wherein said hollow opening is adapted to receive the precision screw 17. It should be noted that the first end 5a' of the spacer 5' includes one or more openings adapted to receive the one or more bolts or fasteners from the base B' in order to secure the first end of the spacer 5' to the base B' of the second drive reducer 3'. Likewise, the second end of the the second spacer 5' includes one or more openings adapted to receive the one or more bolts or fasteners from the base B' in order to secure the second end of the second spacer 5' to the rear wall c2 of the storage compartment 16. It should also be noted that the spacer 5' preferably has a cylindrical configuration; and that the side walls 5c' may include one or more openings 5e' adapted to provide ventilation to the precision screw 17 within the second spacer 5'.

The precision lead screw 17 includes a first end 17a adapted to couple with the coupling unit S1'; and a second end 17b adapted to couple to a mounted bearing 20 that is attached to the front wall c1 of the diverter gate storage compartment 16. Inside the storage compartment 16, the precision lead screw 17 is connected to the diverter gate 15 via a supporting base 18. The purpose of the diverter gate 15 is to control access to the rotating shovel 6' within the interior volume of the housing 7'. The diverter gate 15 can reach the interior volume of the housing 7' because the front wall c1 of the storage compartment 16 includes an opening 19 that enables the diverter gate 15 to reach the interior volume of the housing 7' or to be retracted and stored in the storage compartment 16, as further explained below.

It should be noted that the actuation of the second motor 2' causes the precision lead screw 17 to rotate either in a clockwise direction or in a clockwise depending on the direction selected by a user of the system 1A. Clockwise rotation of the precision lead screw 17 causes the base 18, along with the diverter plate 15 connected thereto, to move towards the interior volume of the housing 7', thereby causing the diverter plate 15 to close off access to the rotating shovel 6' within the interior volume of the housing 7'. Conversely, the counterclockwise rotation of the precision lead screw 17 causes the base 18, along with the diverter plate 15 connected thereto, to move away from the interior volume of the housing 7', thereby opening access to the rotating shovel 6' within the interior volume of the housing 7'.

It should be noted that when the centrifuge decanter 14 is creating its internal sludge seal the diverter plate 15 should close off access to the rotating shovel 6'. During the start-up of a centrifuge decanter, wet sludge will normally come out through the dried sludge outlet of the centrifuge decanter. During this stage, diverter plate 15 closes off access to the rotating shovel 6' and directs any remaining liquid towards the drain port 22 for expulsion from system 1A. Once all liquid has been drained and the sludge is dry (i.e., when the decanter creates its internal seal), the diverter plate 15 is stored in storage compartment 16, allowing the dried sludge access to the rotating shovel 6'. When the centrifuge decanter 14 is shutting down or in flushing mode, the diverter plate 15 closes again. In other words, the opening and closing of access to the rotating shovel 6' prevents wet sludge transported via the centrifuge decanter 14 from reaching the rotating shovel 6'. While the sludge is still wet, the diverter plate 15 closes off access to the rotating shovel 6'. Any remaining liquid from the wet sludge is expelled or drained via the drain port 22. Once the sludge is fully dried, the diverter plate 15 is retracted and stored in the storage compartment 16, thereby allowing the dried sludge to reach or be directed towards the rotating shovel 6' within the interior volume of the housing 7'. The diverter gate 15 is preferably rectangular in shape and comprises an upper face and a bottom face, each face behind the other.

The supporting base 18, in turn, comprises an acme nut 18a adapted to receive the precision lead screw 17; and a flange 18b adapted to connect the base 18, via one or more screws, to the upper face of the diverter gate 15. As such, rotation of the precision lead screw 17 within the acme nut 18a is what causes the diverter gate 15 to move towards the opening 19 in the front wall c1 (to close off access to the rotating shovel 6' within the interior volume of the housing 7'); or away from the front wall c1 of the storage compartment 16 (to open access to the rotating shovel 6' within the interior volume of the housing 7') depending on the direction of rotation of the precision lead screw 17.

FIGS. 17-19, 21, and 25 show a submersible pneumatic pump dried sludge distribution system 1B that comprises a submersible pneumatic motor 30, a rotating shovel 6", a housing 31, and a support base B3 adapted to provide support to the housing 31. The submersible pneumatic motor 30 comprises a body 30a, a top end 30b, and a bottom end 30c, wherein the body 30a is flanked by the top end 30b and the bottom end 30c; and wherein the top end includes a central shaft 32 (located in the center of the top end) and a flange 33 with one or more bolts or screws 33a-b adapted to secure the support base B3 to the flange 33. In a preferred embodiment, the body 30a of the submersible pneumatic 30 is cylindrical. The support base B3 includes one or more inner openings 34a-b adapted to receive the one or more bolts or screws 33a-b. The location of each of the one or more inner openings 34a-b on the base B3 corresponds with the location of the one or more bolts or screws 33a-b on the flange 33. The base B3 further includes one or more outer openings 35a-d adapted to receive one or more screws 36a-d that are adapted to secure the housing 31 to the support base B3. The support base B3 also includes a central hollow opening 37 that is adapted to provide the central shaft 32 of the submersible pneumatic motor 30 with access to the coupling unit S2 of the rotating shovel 6". In a preferred embodiment, the support base B3 is cylindrical and includes a rubber gasket 38 surrounding the central hollow opening 37.

Figure 19:
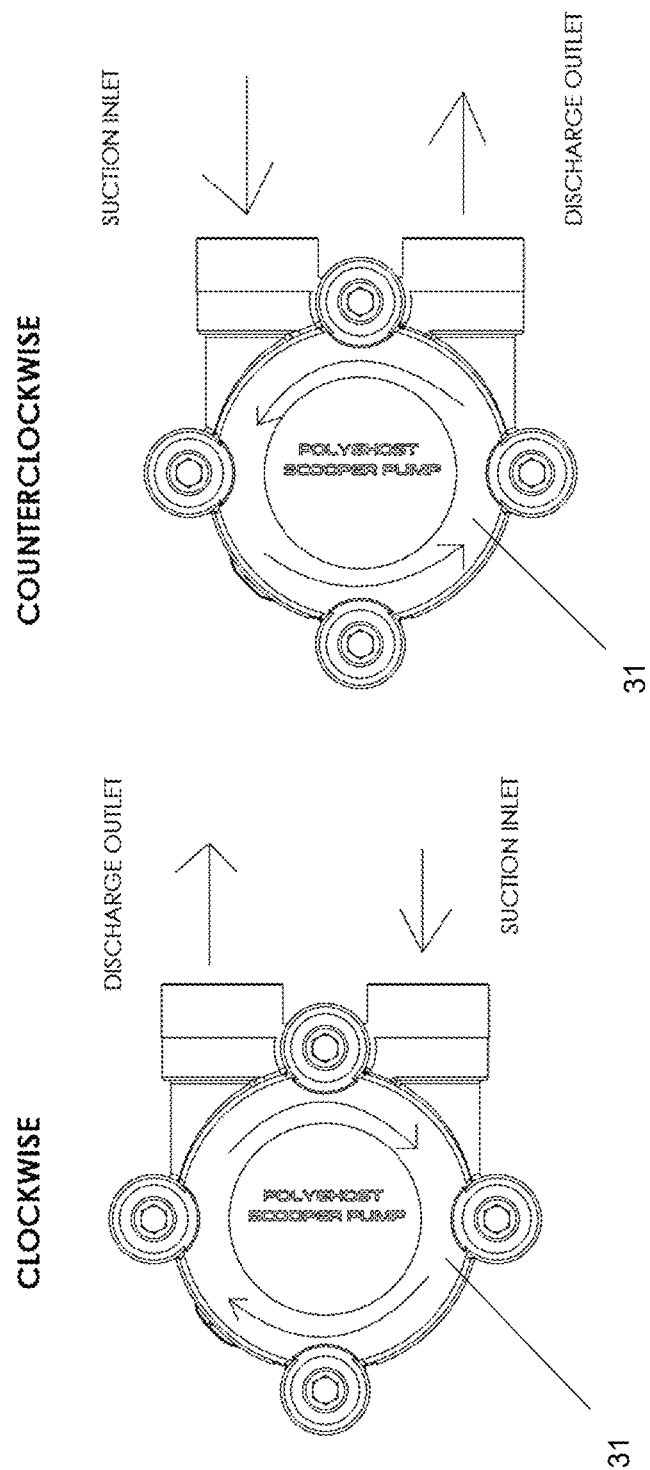
FIG. 19 shows the flow of substance in the submersible pneumatic pump version of the dried sludge distribution system, in accordance with the principles of the present disclosure.
Figure 21:
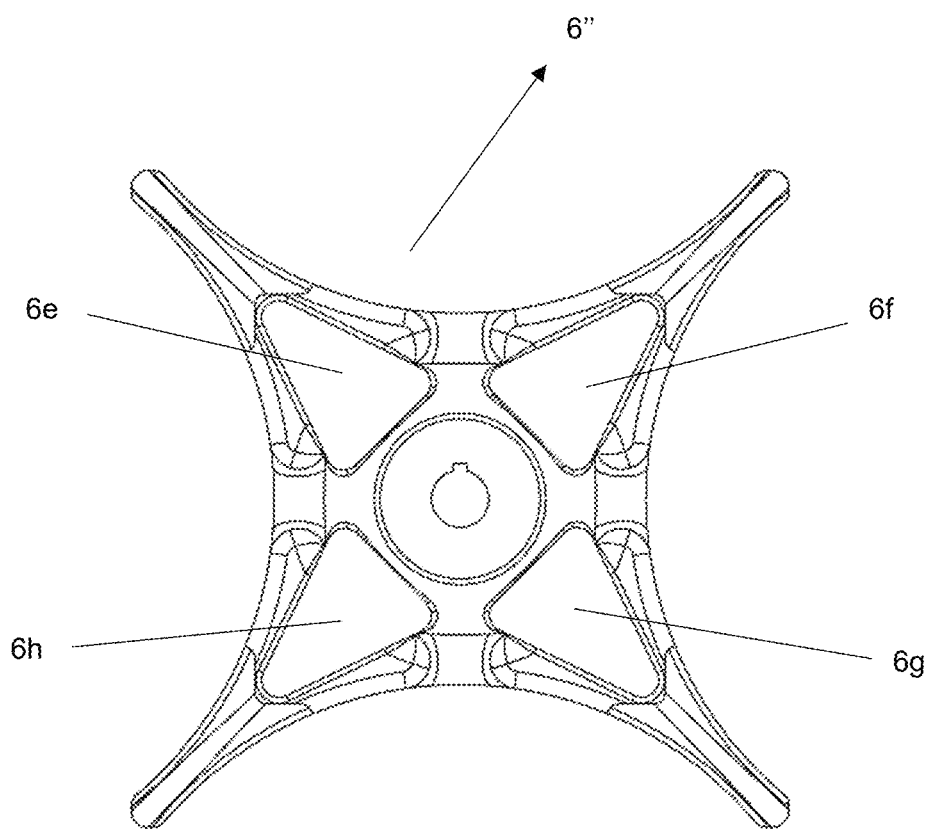
FIG. 21 shows the shovel component of the submersible pneumatic pump version of the dried sludge distribution system, in accordance with the principles of the present disclosure.
Figure 25:
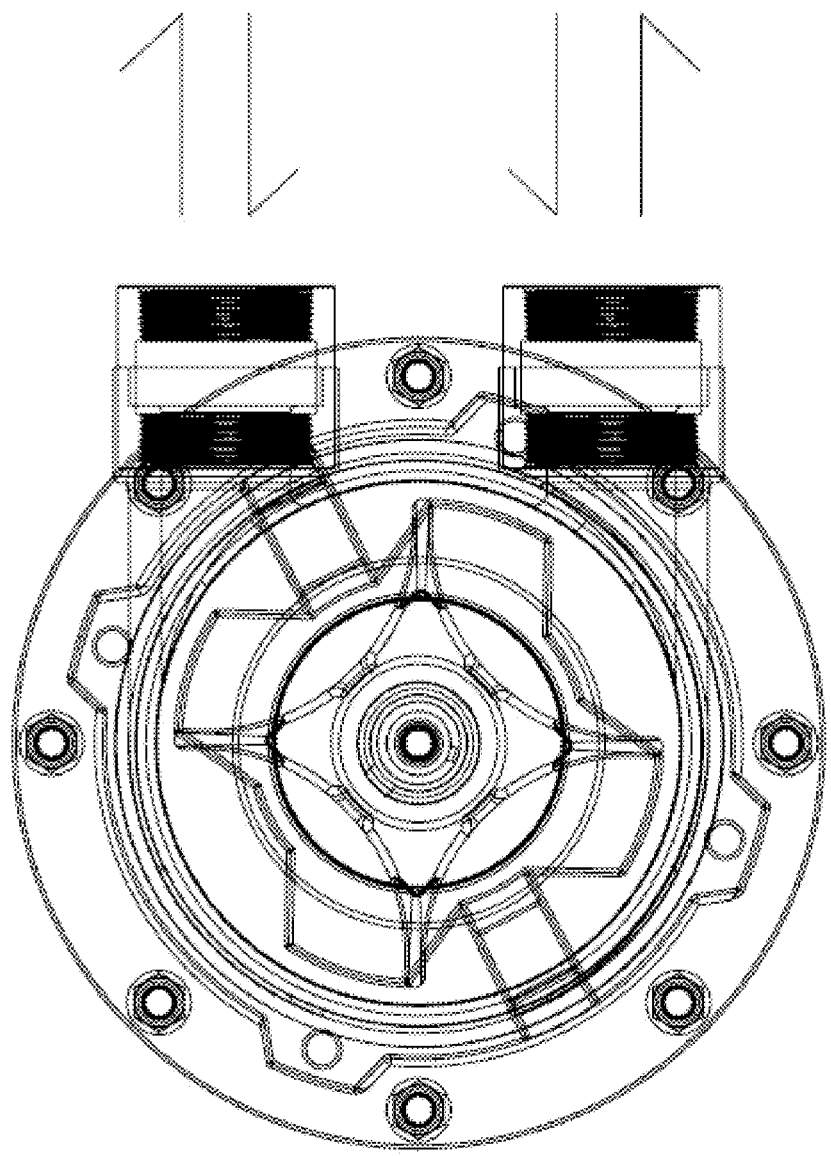
FIG. 25 shows a top view of the internal components of the submersible pneumatic pump version of the dried sludge distribution system, in accordance with the principles of the present disclosure

The rotating shovel 6", in turn, is attached to the central shaft 32 via a coupling unit S2, and the actuation of the submersible pneumatic motor 30 is what causes the rotating shovel 6" to rotate. The structure and shape of the shovel 6" is the same as the structure and shape described for the shovel 6 and shovel 6', although smaller in scale so that it can fit within the housing 31 of the submersible pneumatic pump dried sludge distribution system 1B. As shown in FIG. 21, however, the rotating shovel 6" may include one or more openings 6e-h in the area where the shoveling areas 6a-d are perpendicularly connected to the hollow cylinder 10 that are adapted to permit the flow of substances through said one or more openings 6e-h. This allows the system to act as a pump and mixer simultaneously. As shown in FIG. 19, the flow of substances within the housing 31 may be clockwise or counterclockwise depending on the direction of rotation of the rotating shovel 6". Depending on the direction of rotation of the rotating shovel 6", the role of each of the inlet 31c and the outlet 31d may become inverted, such that the inlet 31c becomes an outlet and the outlet 31d becomes an inlet, as shown in FIGS. 19 and 25.

The housing 31 comprises one or more openings 38a-d adapted to receive the or more screws 36a-d that are adapted to secure the housing 31 to the base B3. The location of the one or more openings 38a-d in the housing 31 correspond with the location of the one o more outer openings 35a-d on the base B3. It should be noted that the housing 31 has a hollow interior 31a adapted to fit the rotating shovel 6" and an outer surface 31b. The one or more openings 38a-d are located on the outer surface 31b of the housing 31. The outer surface of the housing 31 also includes at least one inlet 31c adapted to receive liquid or viscous substances desired to be mixed or pumped in the housing 31; and at least one outlet 31d adapted to release the liquid or viscous substances once they have been mixed or pumped in the housing 31. Lastly, it should be noted that the housing 31 preferably has a cylindrical shape.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A dried sludge distribution system, comprising:
   a motor, a drive reducer, a shaft, a spacer, a rotating shovel, a housing, and a mounted ball bearing;
   wherein the housing includes a front wall, a rear wall, a first side wall, and a second side wall, in which the first side wall and the second side wall connect the front wall to the rear wall, wherein the front wall is opposite to and substantially identical or congruent to the rear wall, and the first side wall is opposite to and substantially identical or congruent to the second side wall, forming a box-like configuration in which adjacent walls are orientated at right angles, and wherein the housing includes an open-ended top and an open-ended bottom opposite each other, thereby defining an interior volume of the housing;
   wherein the box-like configuration of the housing encloses the interior volume on four sides;
   wherein the motor is connected to the drive reducer;
   wherein the drive reducer includes a base that comprises a shaft coupling unit;
   wherein the shaft includes a body having a first end adapted to couple with the shaft coupling unit, and a second end adapted to couple with the rotating shovel, wherein each of the first end of the shaft and the second end of the shaft is opposite the other;
   wherein the spacer includes a first end connected to the drive reducer, a second end connected to the housing, and a hollow opening that longitudinally crosses the first end of the spacer and the second end of the spacer;
   wherein the hollow opening of the spacer is adapted to receive the shaft;
   wherein the rotating shovel includes a central hollow cylinder having a first end adapted to receive the shaft and a second end, opposite to the first end of the central hollow cylinder, that is adapted to couple with the mounted ball bearing;
   wherein the rotating shovel comprises one or more shoveling areas extending perpendicularly from the central hollow cylinder;
   wherein the rear wall of the housing includes an opening adapted to receive the shaft; and
   wherein the front wall of the housing includes an opening adapted to permit the second end of the central hollow cylinder of the rotating shovel to be secured to the mounted ball bearing; and
   wherein the rotating shovel is disposed within the interior volume of the housing such that the rotating shovel is surrounded on four sides by the front wall of the housing, the rear wall of the housing, the first side wall of the housing, and the second side wall of the housing.

2. The dried sludge distribution system of claim 1, wherein the shaft includes one or more protrusions extending perpendicularly from the body of the shaft.

3. The dried sludge distribution system of claim 2, wherein the shovel is adapted to couple and engage with the one or more protrusions extending perpendicularly from the body of the shaft.

4. The dried sludge distribution system of claim 3, wherein the hollow cylinder includes one or more projections within the hollow cylinder that engage with the one or more protrusions on the shaft and thereby secure and lock in the second end of the shaft to the rotating shovel.

5. The dried sludge distribution system of claim 1, wherein the one or more shoveling areas of the rotating shovel are interconnected with each other.

6. The dried sludge distribution system of claim 5, wherein the one or more shoveling areas of the rotating shovel include one or more indentations.

7. The dried sludge distribution system of claim 1, wherein the open-ended top is adapted to receive dried sludge or particulate matter and the open-ended bottom is adapted to allow the dried sludge or particulate matter to be directed towards a desired area by the rotating shovel.

8. The dried sludge distribution system of claim 1, wherein the first side wall of the housing and the second side wall of the housing include a first cover and a second cover, respectively, adapted to prevent dried sludge from being expelled upwards as the rotating shovel rotates and performs a scooping function of the rotating shovel.

9. The dried sludge distribution system of claim 8, wherein the first cover extends perpendicularly from the first side wall of the housing and the second cover extends perpendicularly from the second side wall of the housing.

10. The dried sludge distribution system of claim 9, wherein the first cover and the second cover of the housing each have a semi-circular or dome-shaped configuration.

11. The dried sludge distribution system of claim 1, wherein the housing is adapted to connect to a conveyor system.

12. The dried sludge distribution system of claim 1, wherein the open-ended top of the housing is connected, via one or more bolts, to a slew drive adapted to rotate 360 degrees, thereby enabling the rotating shovel to disperse dried sludge in different directions.

13. The dried sludge distribution system of claim 1, further comprising a second motor, a second drive reducer, a second spacer, a precision screw, a diverter gate, and a storage compartment connected to the rear wall of the housing, said storage compartment being adapted to house the precision screw and the diverter gate.

14. The dried sludge distribution system of claim 13, wherein the storage compartment comprises a front wall and a rear wall opposite each other, a first side wall and a second side wall opposite each other, and a top end and a bottom end opposite each other;
- wherein the first side wall of the storage compartment and the second side wall of the storage compartment connect the front wall of the storage compartment and the rear wall of the storage compartment to each other;
- wherein the front wall of the storage compartment, the rear wall of the storage compartment, the first side wall of the storage compartment, and the second side wall of the storage compartment are flanked by the top end of the storage compartment and the bottom end of the storage compartment; and
- wherein the front wall of the storage compartment is connected to the rear wall of the housing.

15. The dried sludge distribution system of claim 14, wherein:
- the second motor is connected to the second drive reducer;
- the second drive reducer is connected to a first end of the second spacer;
- a second end of the second spacer is connected to the rear wall of the storage compartment;
- the front wall of the storage compartment comprises a mounted bearing;
- the second drive reducer includes a base that comprises a coupling unit;
- the second spacer includes a hollow opening adapted to receive the precision screw;
- the precision screw includes a first end that is connected to the coupling unit on the base of the second drive reducer, and a second end that is connected to the mounted bearing on the front wall of the storage compartment; and
- the diverter gate is connected to the precision screw.

16. The dried sludge distribution system of claim 15, wherein the front wall of the storage compartment includes an opening adapted to enable the diverter gate to reach the interior volume of the housing or to be retracted and stored in the storage compartment.

17. The dried sludge distribution system of claim 15, wherein the diverter gate is connected to the precision screw via a supporting base.

18. The dried sludge distribution system of claim 15, wherein the supporting base comprises an acme nut adapted to receive the precision screw, and wherein the supporting base comprises a flange adapted to connect the supporting base, via one or more screws, to the diverter gate.

19. The dried sludge distribution system of claim 15, wherein the open-ended top of the housing is connected, via one or more bolts, to a hopper.

20. The dried sludge distribution system of claim 19, wherein the hopper is adapted to connect to a sludge exit of a centrifuge decanter.

* * * * *